(12) United States Patent
Topham et al.

(10) Patent No.: US 11,753,873 B1
(45) Date of Patent: *Sep. 12, 2023

(54) POLYCRYSTALLINE DIAMOND COMPACT AND APPLICATIONS THEREFOR

(71) Applicant: US SYNTHETIC CORPORATION, Orem, UT (US)

(72) Inventors: Greg Carlos Topham, Spanish Fork, UT (US); Renato Ventura, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/323,537

(22) Filed: May 18, 2021

Related U.S. Application Data

(63) Continuation of application No. 16/748,262, filed on Jan. 21, 2020, now Pat. No. 11,035,176, which is a
(Continued)

(51) Int. Cl.
*E21B 10/56* (2006.01)
*E21B 10/62* (2006.01)
(Continued)

(52) U.S. Cl.
CPC ........ *E21B 10/567* (2013.01); *B24D 18/0009* (2013.01); *C22C 26/00* (2013.01);
(Continued)

(58) Field of Classification Search
CPC ........ E21B 10/46; E21B 10/567; E21B 10/62; C22C 2026/008; C22C 26/00
See application file for complete search history.

(56) References Cited

U.S. PATENT DOCUMENTS

| | | | |
|---|---|---|---|
| 4,268,276 | A | 5/1981 | Bovenkerk |
| 4,311,490 | A | 1/1982 | Bovenkerk et al. |

(Continued)

OTHER PUBLICATIONS

Corrected Notice of Allowance for U.S. Appl. No. 15/911,825 dated Feb. 11, 2020.
(Continued)

*Primary Examiner* — Cathleen R Hutchins
(74) *Attorney, Agent, or Firm* — Dorsey & Whitney LLP

(57) ABSTRACT

Embodiments of the invention relate to polycrystalline diamond compacts ("PDCs") including a polycrystalline diamond ("PCD") table having a structure for enhancing at least one of abrasion resistance, thermal stability, or impact resistance. In an embodiment, a PDC includes a PCD table. The PCD table includes a lower region including a plurality of diamond grains exhibiting a lower average grain size and at least an upper region adjacent to the lower region and including a plurality of diamond grains exhibiting an upper average grain size. The lower average grain size may be at least two times greater than that of the upper average grain size. The PDC includes a substrate having an interfacial surface that is bonded to the lower region of the PCD table. Other embodiments are directed methods of forming PDCs, and various applications for such PDCs in rotary drill bits, bearing apparatuses, and wire-drawing dies.

20 Claims, 12 Drawing Sheets

Related U.S. Application Data continuation of application No. 15/911,825, filed on Mar. 5, 2018, now Pat. No. 10,584,539, which is a continuation of application No. 15/078,904, filed on Mar. 23, 2016, now Pat. No. 9,938,775, which is a continuation of application No. 13/590,840, filed on Aug. 21, 2012, now Pat. No. 9,316,059.

(51) Int. Cl.
| | |
|---|---|
| E21B 10/46 | (2006.01) |
| F16C 33/26 | (2006.01) |
| C22C 26/00 | (2006.01) |
| E21B 10/567 | (2006.01) |
| E21B 10/573 | (2006.01) |
| B24D 18/00 | (2006.01) |
| E21B 10/54 | (2006.01) |

(52) U.S. Cl.
CPC .......... *E21B 10/46* (2013.01); *E21B 10/54* (2013.01); *E21B 10/5676* (2013.01); *E21B 10/573* (2013.01); *E21B 10/62* (2013.01); *F16C 33/26* (2013.01); *F16C 2206/04* (2013.01); *F16C 2240/48* (2013.01)

(56) References Cited

U.S. PATENT DOCUMENTS

| | | | |
|---|---|---|---|
| 4,410,054 | A | 10/1983 | Nagel et al. |
| 4,468,138 | A | 8/1984 | Nagel |
| 4,560,014 | A | 12/1985 | Geczy |
| 4,604,106 | A | 8/1986 | Hall et al. |
| 4,738,322 | A | 4/1988 | Hall et al. |
| 4,811,801 | A | 3/1989 | Salesky et al. |
| 4,913,247 | A | 4/1990 | Jones |
| 5,016,718 | A | 5/1991 | Tandberg |
| 5,092,687 | A | 3/1992 | Hall |
| 5,120,327 | A | 6/1992 | Dennis |
| 5,135,061 | A | 8/1992 | Newton, Jr. |
| 5,154,245 | A | 10/1992 | Waldenstrom et al. |
| 5,180,022 | A | 1/1993 | Brady |
| 5,364,192 | A | 11/1994 | Damm et al. |
| 5,368,398 | A | 11/1994 | Damm et al. |
| 5,460,233 | A | 10/1995 | Meany et al. |
| 5,480,233 | A | 1/1996 | Cunningham |
| 5,544,713 | A | 8/1996 | Dennis |
| 5,820,985 | A | 10/1998 | Horton et al. |
| 6,338,754 | B1 | 1/2002 | Cannon et al. |
| 6,793,681 | B1 | 9/2004 | Pope et al. |
| 7,866,418 | B2 | 1/2011 | Bertagnolli et al. |
| 8,236,074 | B1 | 8/2012 | Bertagnolli et al. |
| 8,297,382 | B2 | 10/2012 | Bertagnolli et al. |
| 8,727,046 | B2 | 5/2014 | Miess et al. |
| 8,734,552 | B1 | 5/2014 | Vail et al. |
| 9,316,059 | B1 | 4/2016 | Topham et al. |
| 9,732,563 | B1 | 8/2017 | Mukhopadhyay |
| 9,938,775 | B1 | 4/2018 | Topham et al. |
| 10,030,451 | B1 | 7/2018 | Mukhopadhyay et al. |
| 10,584,539 | B1 | 3/2020 | Topham et al. |
| 10,612,313 | B1 | 4/2020 | Mukhopadhyay |
| 2004/0140132 | A1 | 7/2004 | Middlemiss |
| 2005/0210755 | A1 | 9/2005 | Cho et al. |
| 2006/0191723 | A1 | 8/2006 | Keshavan |
| 2010/0022424 | A1 | 1/2010 | Vogt et al. |
| 2010/0126779 | A1 | 5/2010 | Corbett et al. |
| 2010/0200305 | A1 | 8/2010 | Griffin et al. |
| 2010/0212971 | A1 | 8/2010 | Mukhopadhyay et al. |
| 2010/0294571 | A1 | 11/2010 | Belnap et al. |
| 2011/0031032 | A1* | 2/2011 | Mourik ............ C22C 26/00 175/428 |
| 2011/0031033 | A1 | 2/2011 | Mourik et al. |
| 2011/0067929 | A1 | 3/2011 | Mukhopadhyay et al. |
| 2012/0031675 | A1 | 2/2012 | Truemner et al. |
| 2012/0241226 | A1 | 9/2012 | Bertagnolli et al. |
| 2013/0299249 | A1 | 11/2013 | Weaver et al. |
| 2015/0246427 | A1 | 9/2015 | Can |

OTHER PUBLICATIONS

Corrected Notice of Allowance for U.S. Appl. No. 16/017,657 dated Nov. 12, 2019.
Final Office Action for U.S. Appl. No. 13/590,840 dated Jun. 23, 2015.
Final Office Action for U.S. Appl. No. 13/590,840 dated Sep. 11, 2015.
Final Office Action for U.S. Appl. No. 13/954,545 dated Jan. 10, 2017.
Final Office Action for U.S. Appl. No. 14/539,015 dated Oct. 19, 2017.
Final Office Action for U.S. Appl. No. 15/648,742 dated Aug. 2, 2019.
Issue Notification for U.S. Appl. No. 13/590,840 dated Mar. 30, 2016.
Issue Notification for U.S. Appl. No. 13/954,545 dated Jul. 26, 2017.
Issue Notification for U.S. Appl. No. 14/539,015 dated Jul. 4, 2018.
Issue Notification for U.S. Appl. No. 15/078,904 dated Mar. 21, 2018.
Issue Notification for U.S. Appl. No. 15/648,742 dated Mar. 18, 2020.
Issue Notification for U.S. Appl. No. 15/911,825 dated Feb. 19, 2020.
Issue Notification for U.S. Appl. No. 16/017,657 dated Nov. 13, 2019.
Issue Notification for U.S. Appl. No. 16/748,262 dated May 26, 2021.
Non-Final Office Action for U.S. Appl. No. 13/590,840 dated Feb. 3, 2015.
Non-Final Office Action for U.S. Appl. No. 13/954,545 dated Aug. 12, 2016.
Non-Final Office Action for U.S. Appl. No. 14/539,015 dated Apr. 5, 2017.
Non-Final Office Action for U.S. Appl. No. 15/078,904 dated Jul. 26, 2017.
Non-Final Office Action for U.S. Appl. No. 15/648,742 dated Mar. 22, 2019.
Non-Final Office Action for U.S. Appl. No. 15/911,825 dated May 8, 2019.
Non-Final Office Action for U.S. Appl. No. 16/748,262 dated Nov. 10, 2020.
Notice of Allowance for U.S. Appl. No. 13/590,840 dated Dec. 16, 2015.
Notice of Allowance for U.S. Appl. No. 13/954,545 dated Apr. 13, 2017.
Notice of Allowance for U.S. Appl. No. 14/539,015 dated Mar. 26, 2018.
Notice of Allowance for U.S. Appl. No. 15/078,904 dated Dec. 6, 2017.
Notice of Allowance for U.S. Appl. No. 15/648,742 dated Nov. 21, 2019.
Notice of Allowance for U.S. Appl. No. 15/911,825 dated Oct. 22, 2019.
Notice of Allowance for U.S. Appl. No. 16/017,657 dated Jun. 26, 2019.
Notice of Allowance for U.S. Appl. No. 16/748,262 dated Feb. 18, 2021.
Restriction Requirement for U.S. Appl. No. 13/590,840 dated Nov. 4, 2014.
Restriction Requirement for U.S. Appl. No. 13/954,545 dated Apr. 7, 2016.
Restriction Requirement for U.S. Appl. No. 15/648,742 dated Dec. 18, 2018.
U.S. Appl. No. 12/185,457, filed Aug. 4, 2008.
U.S. Appl. No. 13/324,237, filed Dec. 13, 2011.
U.S. Appl. No. 13/590,840, filed Aug. 21, 2012.

(56) References Cited

OTHER PUBLICATIONS

U.S. Appl. No. 13/795,027, filed Mar. 12, 2013.
U.S. Appl. No. 13/954,545, filed Jul. 30, 2013.
U.S. Appl. No. 14/081,960, filed Nov. 15, 2013.
U.S. Appl. No. 14/539,015, filed Nov. 12, 2014.
U.S. Appl. No. 15/078,904, filed Mar. 23, 2016.
U.S. Appl. No. 15/648,742, filed Jul. 13, 2017.
U.S. Appl. No. 16/017,657, filed Jun. 25, 2018.
U.S. Appl. No. 16/585,639, filed Sep. 27, 2019.
U.S. Appl. No. 61/727,841, filed Nov. 19, 2012.
U.S. Appl. No. 61/768,812, filed Feb. 25, 2013.
"Standard Test Mehtod for Determination of Coercivity (HCS) of Cemented Carbides", ASTM B887-03, 2008.
"Standard Test Method for Determination of Magnetic Saturation (MS) of Cemented Carbides", ASTM B886-03, 2008.
Decker, et al., "High-Pressure Calibration: A Critical Review", J. Phys. Chem. Ref. Data, vol. 1, No. 3, pp. 19721-19779.
Rousse, et al., "Structure of the intermediate phase of PbTe at high pressue", Physical Review B, Condensed Matter and Materials Physics, 71, 2005, 224116-1-224116-6.
Notice of Allowance for U.S. Appl. No. 16/789,825 dated Jan. 9, 2023.
Non-Final Office Action for U.S. Appl. No. 16/789,825 dated Jul. 7, 2022.
Notice of Allowance for U.S. Appl. No. 16/585,639 dated Nov. 21, 2022.
Supplemental Notice of Allowance for U.S. Appl. No. 16/585,639 dated Jul. 20, 2023.

\* cited by examiner

POLYCRYSTALLINE DIAMOND COMPACT AND APPLICATIONS THEREFOR

CROSS-REFERENCE TO RELATED APPLICATIONS

This application is a continuation of U.S. application Ser. No. 16/748,262 filed 21 Jan. 2020, which is a continuation of U.S. application Ser. No. 15/911,825 filed 5 Mar. 2018, which is a continuation of U.S. application Ser. No. 15/078,904 filed 23 Mar. 2016, which is a continuation of U.S. application Ser. No. 13/590,840 filed on 21 Aug. 2012, now U.S. Pat. No. 9,316,059 issued on 19 Apr. 2016, the disclosure of each of which is incorporated herein, in its entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer commonly referred to as a diamond table. The diamond table may be formed and bonded to a substrate using a high-pressure, high-temperature ("HPHT") process. The PDC cutting element may also be brazed directly into a preformed pocket, socket, or other receptacle formed in the bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned adjacent to the cemented carbide substrate. A number of such containers may be loaded into an HPHT press. The substrate and volume of diamond particles are then processed under HPHT conditions in the presence of a catalyst that causes the diamond particles to bond to one another to form a matrix of bonded diamond grains defining a polycrystalline diamond ("PCD") table that is bonded to the substrate. The catalyst is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded diamond grains.

The presence of the metal-solvent catalyst in the PCD table is believed to reduce the thermal stability of the PCD table at elevated temperatures. For example, the difference in thermal expansion coefficient between the diamond grains and the metal-solvent catalyst is believed to lead to chipping or cracking of the PCD table during drilling or cutting operations, which can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, thereby degrading the mechanical properties of the PDC.

One conventional approach for improving the thermal stability of a PDC is to at least partially remove the metal-solvent catalyst from the PCD table of the PDC by acid leaching. However, removing the metal-solvent catalyst from the PCD table can be relatively time consuming for high-volume manufacturing. Additionally, depleting the metal-solvent catalyst may decrease the mechanical strength of the PCD table.

Despite the availability of a number of different PCD materials, manufacturers and users of PCD materials continue to seek PCD materials that exhibit improved mechanical and/or thermal properties.

SUMMARY

Embodiments of the invention relate to PDCs including a PCD table having a structure for enhancing at least one of abrasion resistance, thermal stability, or impact resistance. In an embodiment, a PDC includes a PCD table. The PCD table includes a lower region including a plurality of diamond grains exhibiting a lower average grain size, and at least an upper region positioned adjacent to the lower region and including a plurality of diamond grains exhibiting an upper average grain size. The lower average grain size may be at least two times greater than that of the upper average grain size. The PDC includes a substrate having an interfacial surface that is bonded to the lower region of the PCD table.

In an embodiment, a method of fabricating a PDC includes enclosing a combination in a pressure transmitting medium to form a cell assembly. The combination includes a substrate having an interfacial surface, a lower region including a plurality of diamond particles positioned at least proximate to the interfacial surface of the substrate, and at least an upper region including a plurality of diamond particles positioned adjacent to the lower region. The plurality of diamond particles of the lower region exhibits an average particle size that is at least two times greater than that of an average particle size of the plurality of diamond particles of the at least an upper region. The method further includes subjecting the cell assembly to an HPHT process to form a PCD table integrally with the substrate.

Further embodiments relate to applications utilizing the disclosed PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Embodiments of the invention relate to PDCs including a PCD table having a structure for enhancing at least one mechanical property of the PDC (e.g., at least one of abrasion resistance, thermal stability, or impact resistance), methods of fabricating such PDCs, and applications for such PDCs in rotary drill bits, bearing apparatuses, wire-drawing dies, machining equipment, and other articles and apparatuses. Residual stresses in PDCs may occur after HPHT processing due to the difference in thermal expansion between the PCD table and the substrate. Forming the PCD table to exhibit a structure from at least one region of diamond particles having a relatively coarse average particle size adjacent to the substrate and at least another region of diamond particles having a fine average particle size that ultimately is positioned near an upper, working surface of the PCD table so formed that may mitigate related high residual tensile stresses to thereby provide for relatively more secure bonding of the PCD table to the substrate. The regioning or layering of coarse and fine diamond particle sizes may also limit infiltration of the fine average particle size region with infiltrant from the substrate during HPHT processing to enhance at least one of abrasion resistance, thermal stability, or impact resistance during use of the resulting PDC.

Figure 1A:
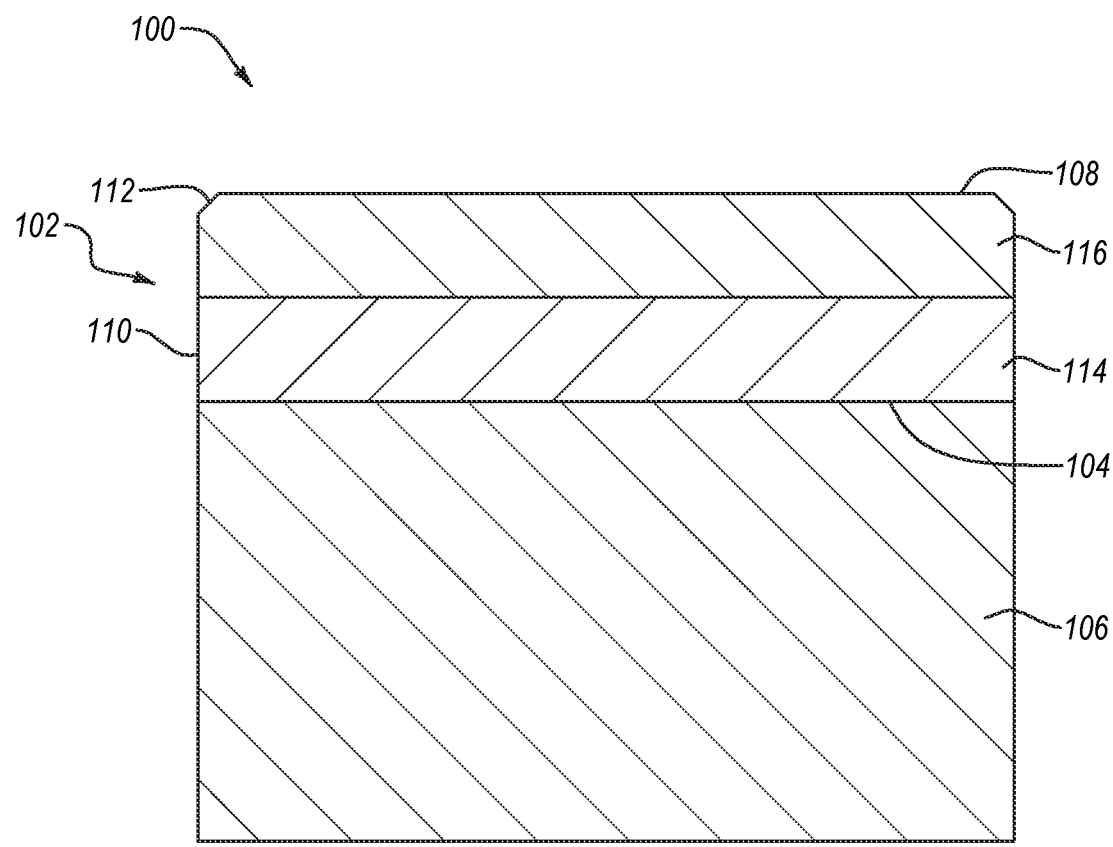
FIG. 1A a cross-sectional view of a PDC according to an embodiment.
Figure 1B:
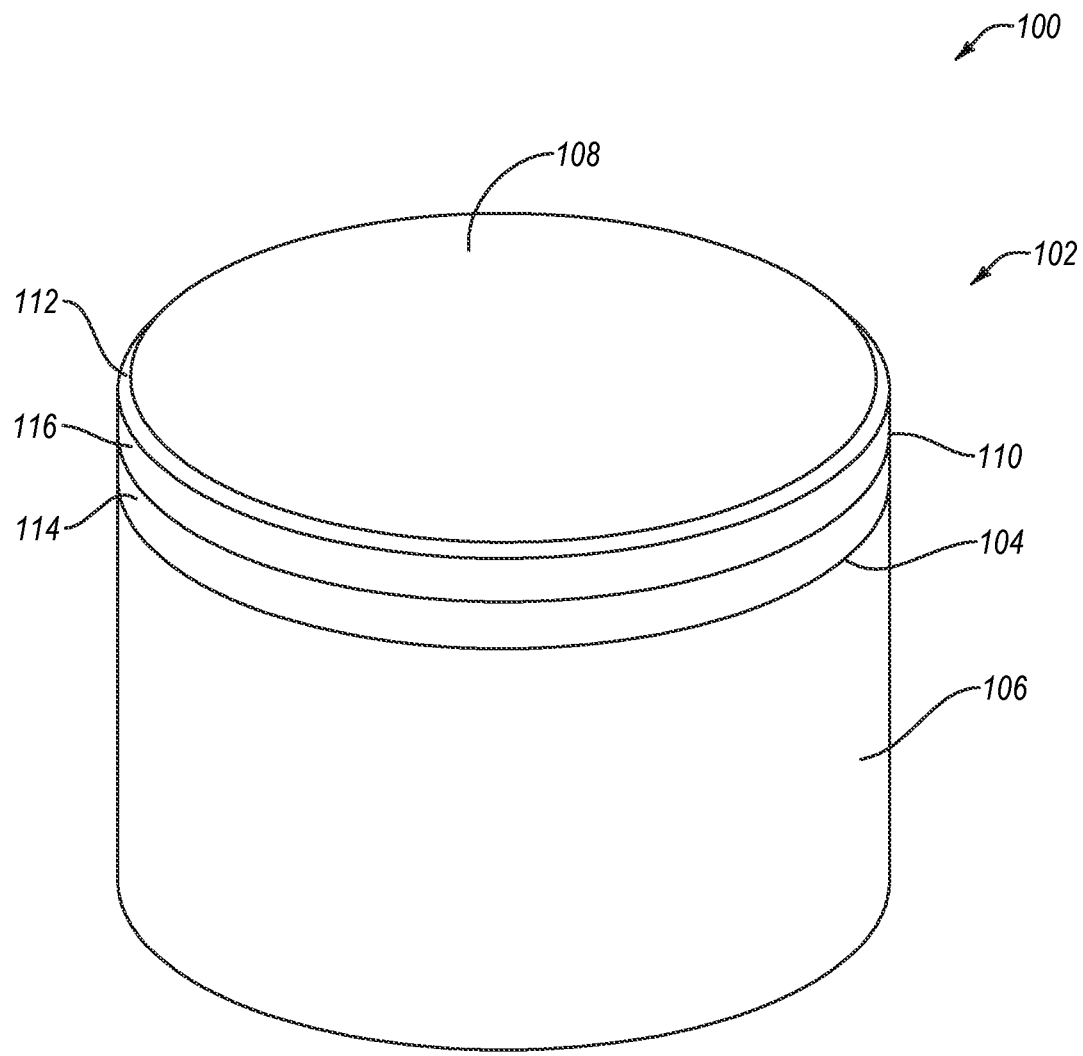
FIG. 1B is an isometric view of the PDC shown in FIG. 1A.

FIGS. 1A and 1B are cross-sectional and isometric views, respectively, of a PDC 100 according to an embodiment. The PDC 100 includes a PCD table 102 bonded to an interfacial surface 104 of a substrate 106. The PCD table 102 includes an upper surface 108, at least one lateral surface 110, and an optional chamfer 112 extending therebetween. One or more of the upper surface 108, at least one lateral surface 110, or chamfer 112 may function as a working/cutting or bearing surface during use. Although FIGS. 1A and 1B show the upper surface 108 and the interfacial surface 104 as being substantially planar, the upper surface 108 and/or the interfacial surface 104 may be concave, convex, or another selected non-planar geometry.

The substrate 106 may be generally cylindrical or another selected configuration, without limitation. The substrate 106 may also include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 106 comprises cobalt-cemented tungsten carbide.

The PCD table 102 includes a plurality of diamond grains directly bonded together via diamond-to-diamond bonding (e.g., $sp^3$ bonding) that defines a plurality of interstitial regions. At least a portion of the interstitial regions or, in some embodiments, substantially all of the interstitial regions may be occupied by a metal-solvent catalyst, such as iron, nickel, cobalt, or alloys of any of the foregoing metals.

The PCD table 102 further includes a lower region 114 (e.g., a portion, a layer, etc.) bonded to the interfacial surface 104 of the substrate 106, and an upper region 116 (e.g., a portion, a layer, etc.) positioned adjacent to and bonded to the lower region 114. The lower region 114 includes a lower average grain size that is relatively coarser than an upper average grain size of the upper region 116. The lower average grain size of the lower region 114 may be at least two times greater than that of the upper average grain size of the upper region 116. As discussed above, the PDC 100 including such a layered PCD table 102 may provide for enhancing at least one of abrasion resistance, thermal stability, or impact resistance and a relatively more secure bond of the PCD table 102 to the substrate 106.

According to various embodiments, the coarse lower average grain size of the lower region 114 may be at least about 50 µm, at least about 60 µm, about 50 µm to about 75 µm, about 60 µm to about 80 µm, about 65 µm to about 75 µm, greater than about 70 µm, greater than about 60 µm, about 60 µm to about 75 µm, about 65 µm to about 85 µm, about 65 µm to about 72 µm, about 63 µm to about 78 µm, about 70 µm, at least about 2.0 times the upper average grain size, about 2 times the upper average grain size to about 3.5 times (e.g., about 2.5 to about 3.5) the upper average grain size, at least about 2.5 times the upper average grain size, at least about 3.5 times the upper average grain size, and the upper average grain size of the upper region 116 may be less than about 40 µm, about 20 µm to about 35 µm, less than about 30 µm, about 20 µm to about 40 µm, about 28 µm to about 32 µm, or about 25 µm to about 35 µm, greater than 10 µm, about 10 µm to about 40 µm, less than about 30 µm, less than about 35 µm, about 15 µm to about 35 µm, or about 30 µm. Any combination of the lower and upper average grain sizes may be employed provided that the lower average grain size is at least about 2 times the upper average grain size.

In one or more embodiments, the lower region 114 includes diamond grains and may also include at least one additive that together defines the interstitial regions having the metal-solvent catalyst disposed in at least a portion of the interstitial regions. The at least one additive may be chosen from tungsten carbide particles, cemented tungsten carbide particles (e.g., individual particles formed of tungsten carbide particles cemented together with cobalt or a cobalt alloy), tungsten particles, or mixtures thereof. For example, the cemented tungsten carbide particles may be formed by sintering tungsten carbide particles with a binder (e.g., cobalt), crushing the sintered product into a plurality of particles, and classifying the crushed particles to a specific particle size range. The amount of the at least one additive present in lower region 114 may be about 1 weight % to about 20 weight % of the lower region 114, such as about 1 weight % to about 15 weight %, about 1 weight % to about 5 weight %, about 2 weight % to about 5 weight %, about 1 weight % to about 10 weight %, about 3 weight % to about 10 weight %, about 2 weight % to about 15 weight %, about 10 weight % to about 20 weight %, about 5 weight % to about 15 weight %, or about 10 weight % to about 15 weight % of the lower region 114, with the balance substantially being diamond grains and the metal-solvent catalyst. In some embodiments, the upper region 116 may be substantially free of the at least one additive, while in other embodiments, a small amount of the at least one additive may migrate into the upper region 116 during formation thereof.

The average diamond grain sizes of the lower region 114 and the upper region 116 may be the substantially same, similar, or may vary from that of the precursor average diamond particle sizes from which they are formed. For example, the coarse diamond grains of the lower region 114 may be formed from diamond particles having a lower average particle size (e.g., at least about 60 μm, about 60 μm to about 80 μm, about 65 μm to about 75 μm, greater than about 70 μm, greater than about 60 μm, about 60 μm to about 75 μm, about 65 μm to about 85 μm, about 68 μm to about 72 μm, about 63 μm to about 78 μm, about 70 μm, at least about 2 times the upper average particle size, about 2 times the upper average particle size to about 3.5 times (e.g., about 2.5 to about 3.5) the upper average particle size, at least about 2.5 times the upper average particle size, at least about 3.5 times the upper average particle size, etc.). In an embodiment, the diamond grains of the upper region 116 may be formed from fine diamond particles having an upper average particle size that is less than the lower average particle size of the lower region 114 (e.g., an upper average particle size of less than about 40 μm, about 20 μm to about 35 μm, less than about 30 μm, about 20 μm to about 40 μm, about 28 μm to about 32 μm, or about 25 μm to about 35 μm, greater than 10 μm, about 10 μm to about 40 μm, less than about 30 μm, less than about 35 μm, about 15 μm to about 35 μm, or about 30 μm). In some embodiments, the diamond particle formulations from which the lower and upper regions 114 and 116 are formed may include bi-modal or greater diamond particle formulations. Any combination of the lower and upper average particle sizes may be employed provided that the lower average particle size is at least about 2 times the upper average particle size.

In one or more embodiments, the $G_{ratio}$ of the PCD table 102 of the PDC 100 may be about $1 \times 10^6$ to about $1.5 \times 10^7$, such as about $2 \times 10^6$ to about $4 \times 10^6$, about $1 \times 10^6$ to about $3.5 \times 10^6$, about $2.5 \times 10^6$ to about $3.0 \times 10^6$, about $4 \times 10^6$ to about $6.5 \times 10^6$, about $5 \times 10^6$ to about $7.5 \times 10^6$, at least about $2 \times 10^6$, or about $4 \times 10^6$. The $G_{ratio}$ may be evaluated using a vertical turret lathe ("VTL") test by measuring the volume of the PDC 100 removed versus the volume of Barre granite workpiece removed, while the workpiece is cooled with water. The test parameters may include a depth of cut for the PDC 100 of about 0.254 mm, a back rake angle for the PDC 100 of about 20 degrees, an in-feed for the PDC 100 of about 6.35 mm/rev, and a rotary speed of the workpiece to be cut of about 101 RPM.

Although the illustrated embodiment of the PCD table 102 shown in FIGS. 1A and 1B only utilizes two distinct regions of diamond grains, two or more, or more than three regions may be employed. In an embodiment, each region may have a progressively smaller average diamond grain size with distance away from the substrate 106. The inventors believe that this regioned or layered structure for the PCD table 102 of coarse average diamond grain size of the lower region 114 adjacent to the substrate with progressively smaller average diamond grain sizes with distance away from the substrate 106 in the upper region 116, and optional additional regions may limit infiltrant from the substrate 106 (e.g., cobalt) from infiltrating into the regions closest to the upper surface 108 during fabrication, which provides for at least one of increased abrasion resistance, thermal stability, or higher impact resistance of the PDC 100 so-formed.

Figure 2A:
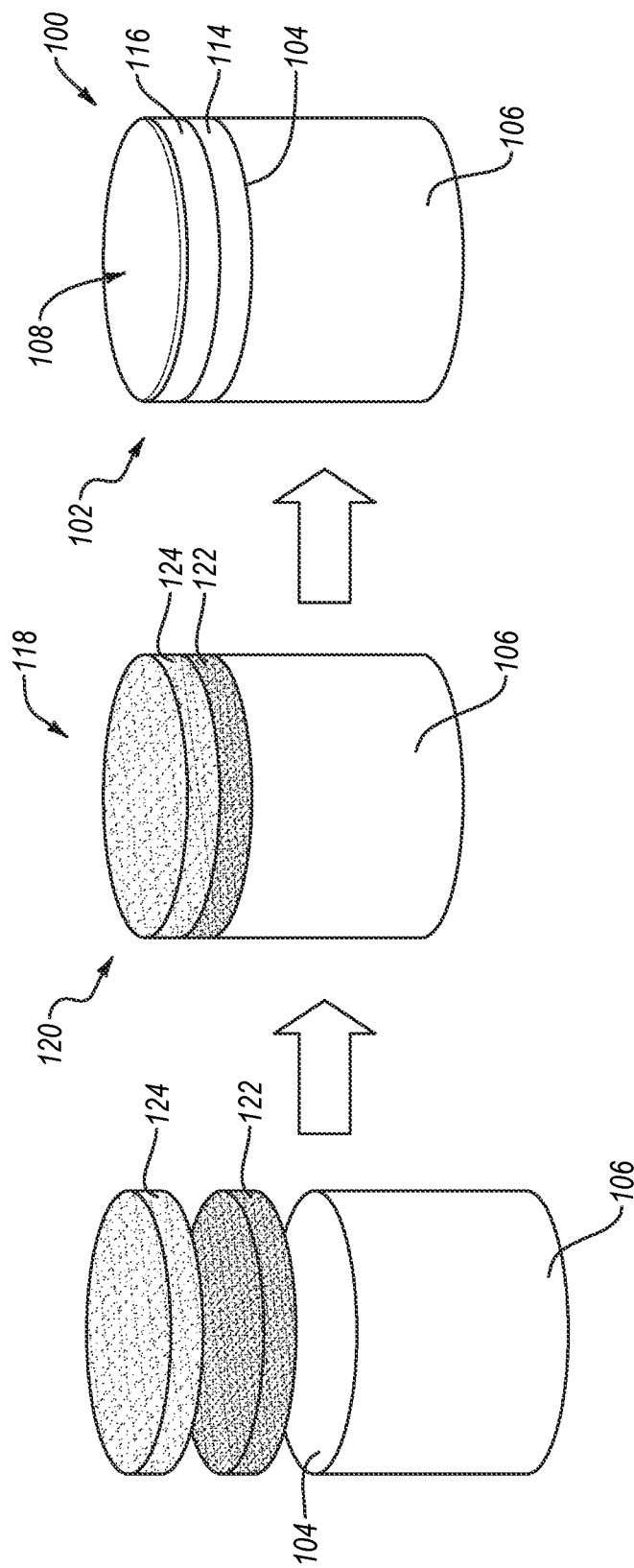
FIG. 2A is a schematic illustration of a method of fabricating the PDC shown in FIGS. 1A and 1B according to an embodiment.
Figure 2B:
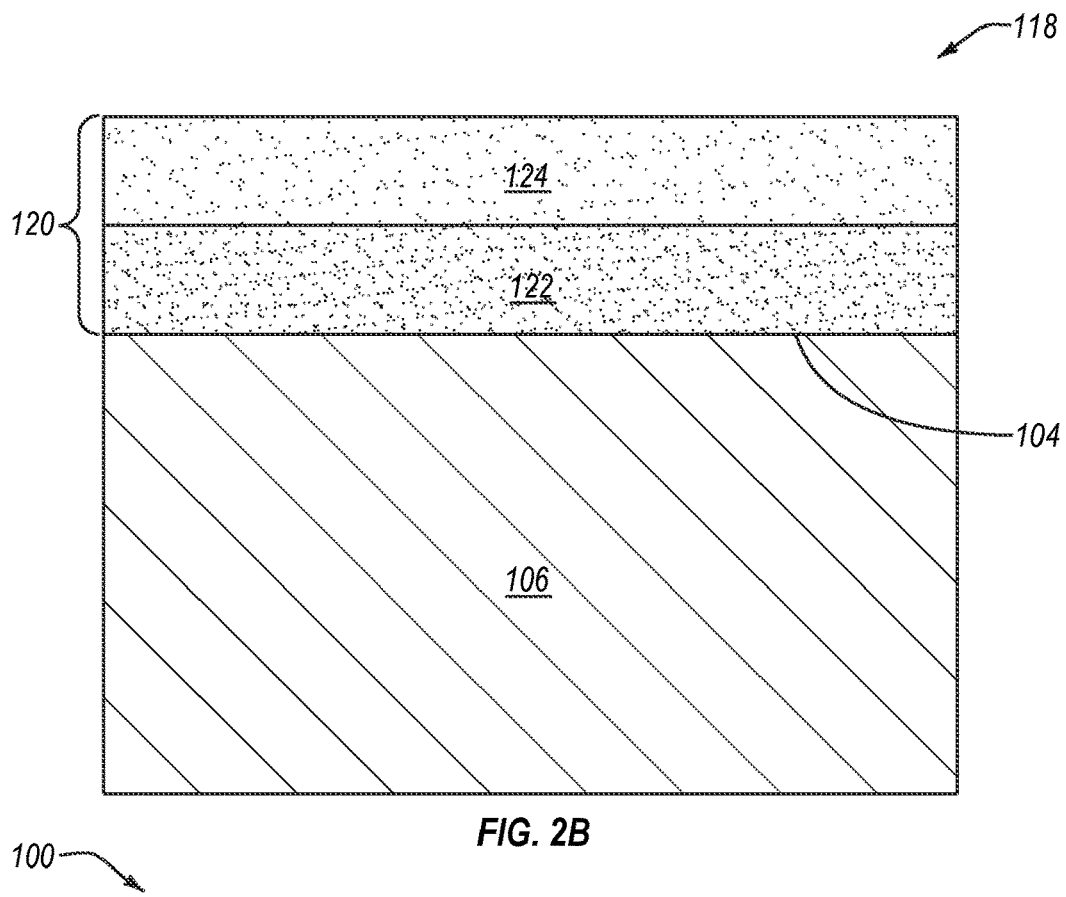
FIG. 2B is a cross-sectional view of the PDC assembly shown in FIG. 2A according to an embodiment.

FIG. 2A is a schematic illustration of a method for fabricating the PDC 100 shown in FIGS. 1A and 1B. FIGS. 2A and 2B illustrate a PDC precursor assembly 118 including a PCD precursor assembly 120 that includes a lower region 122. The lower region 122 includes diamond particles having a coarse average particle size using any of the lower average particle sizes for the lower region 114 discussed above with respect to FIGS. 1A and 1B. The PCD precursor assembly 120 also includes an upper region 124 including diamond particles positioned adjacent to the lower region 122. The upper region 124 exhibits an upper average particle size that is less than the lower average particle size of the lower region 122 using any of the upper average particle sizes for the upper region 116 discussed above with respect to FIGS. 1A and 1B. In one or more embodiments, the lower region 122 may also include at least one additive including about 1 weight % to about 20 weight % (e.g., about 3 weight % to about 18 weight % or any of the previously disclosed concentrations for the at least one additive) of tungsten, tungsten carbide, sintered cemented tungsten carbide particles, or combinations thereof. For example, the at least one additive may be present in the lower region 122 in an amount of about 1 weight % to about 15 weight %, about 1 weight % to about 5 weight %, about 2 weight % to about 5 weight %, about 1 weight % to about 10 weight %, about 3 weight % to about 10 weight %, about 2 weight % to about 15 weight %, about 10 weight % to about 20 weight %, about 5 weight % to about 15 weight %, or about 10 weight % to about 15 weight % of the lower region 122, with the balance of the lower region 122 being substantially diamond particles. In some embodiments, the upper region 124 may be substantially free of the at least one additive, while in other embodiments, a small amount of the at least one additive (i.e., less than the amount present in the lower region 122) may migrate into the upper region 124 during HPHT processing.

Although the illustrated embodiment of the PDC precursor assembly 118 shown in FIGS. 2A and 2B only utilizes two regions of diamond particles, two or more, or more than three regions may be employed. In an embodiment, each region may have a progressively smaller average diamond particle size with distance away from the substrate 106.

Referring to FIG. 2B, the PDC precursor assembly 118 may be subjected to an HPHT process to form the PDC 100 (shown in FIGS. 1A, 1B, 2A, and 2C). The PCD precursor assembly 120 and the substrate 106 may be placed in a pressure transmitting medium to form the PDC precursor assembly 118. For example, the pressure transmitting medium may include a refractory metal can, graphite structure, pyrophyllite, other pressure transmitting structures, or combinations thereof. Examples of suitable gasket materials and cell structures for use in manufacturing PCD are disclosed in U.S. Pat. Nos. 6,338,754 and 8,236,074, each of which is incorporated herein, in its entirety, by this reference. Another example of a suitable pressure transmitting material is pyrophyllite, which is commercially available from Wonderstone Ltd. of South Africa. The PDC precursor assembly 118, including the pressure transmitting medium and the diamond particles therein, is subjected to an HPHT process at diamond-stable conditions using an ultra-high pressure press at a temperature of at least about 1000° C. (e.g., about 1100° C. to about 2200° C., or about 1200° C. to about 1450° C.) and a cell pressure in the pressure transmitting medium of at least about 5 GPa (e.g., about 5.0 GPa to about 6.5 GPa, about 7.5 GPa to about 15 GPa, or at least about 7.5 GPa) for a time sufficient to sinter the diamond particles together in the presence of the metal-solvent catalyst and form the PCD table 102 comprising directly bonded-together diamond grains defining interstitial regions occupied by a metal-solvent catalyst. For example, the pressure in the pressure transmitting medium employed in the HPHT process may be at least about 8.0 GPa, at least about 9.0 GPa, at least about 10.0 GPa, at least about 11.0 GPa, at least about 12.0 GPa, or at least about 14 GPa.

The pressure values employed in the HPHT processes disclosed herein refer to the pressure in the pressure transmitting medium at room temperature (e.g., about 25° C.) with application of pressure using an ultra-high pressure press and not the pressure applied to the exterior of the PDC precursor assembly 118. The actual pressure in the pressure transmitting medium at sintering temperature may be slightly higher. The ultra-high pressure press may be calibrated at room temperature by embedding at least one calibration material that changes structure at a known pressure such as, PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

The PDC 100 so-formed (FIG. 2C) includes the PCD table 102 that comprises the lower and upper regions 114 and 116, which are integrally formed with the substrate 106 and bonded to the interfacial surface 104 of the substrate 106. If the substrate 106 includes a metal-solvent catalyst (e.g., cobalt in a cobalt-cemented tungsten carbide substrate), the metal-solvent catalyst therein may liquefy and infiltrate the lower and upper regions 122 and 124 to promote growth between adjacent diamond particles to catalyze formation of the PCD table 102. For example, if the substrate 106 is a cobalt-cemented tungsten carbide substrate, cobalt from the substrate 106 may be liquefied and infiltrate the lower and upper regions 122 and 124 to catalyze formation of diamond-to-diamond bonding in the PCD table 102 during the HPHT process. Although the coarse average diamond particle size of the lower region 122 acts to limit infiltration of the liquefied infiltrant into the upper region 124 of diamond particles, the infiltrant may still be present in the upper region 116 of diamond grains of the PCD table 102.

Figure 2C:
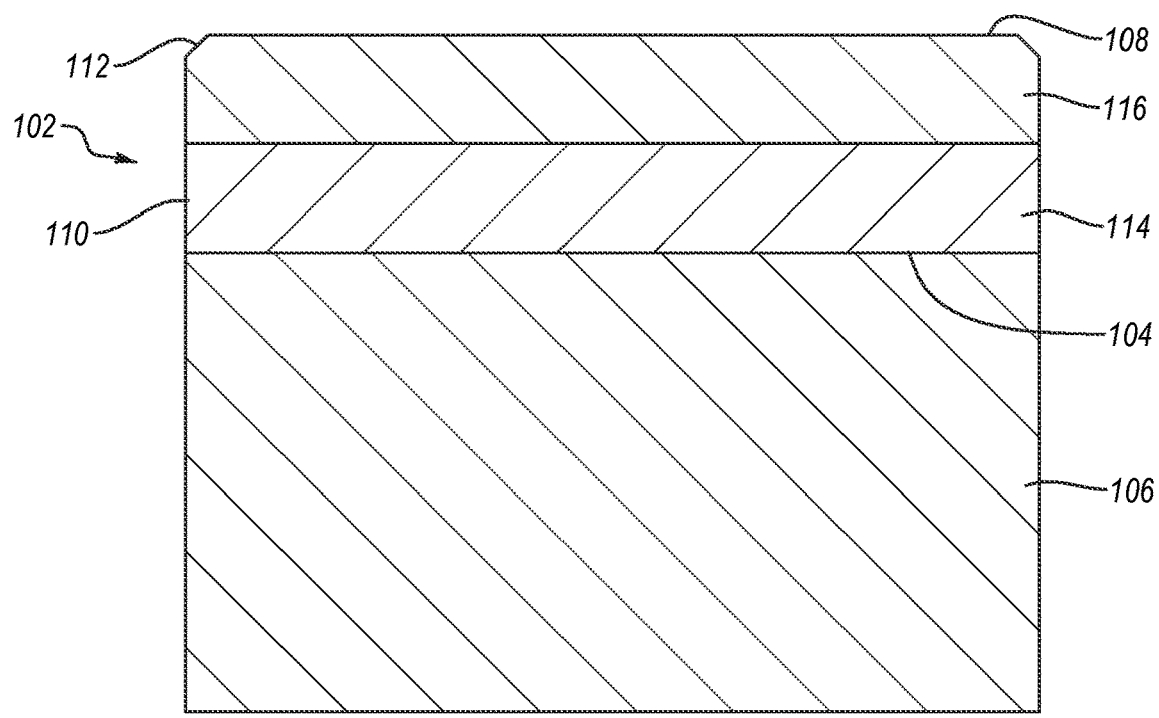
FIG. 2C is a cross-sectional view of the PDC fabricated by HPHT processing the PDC assembly shown in FIGS. 2A and 2B according to an embodiment.
Figure 2D:
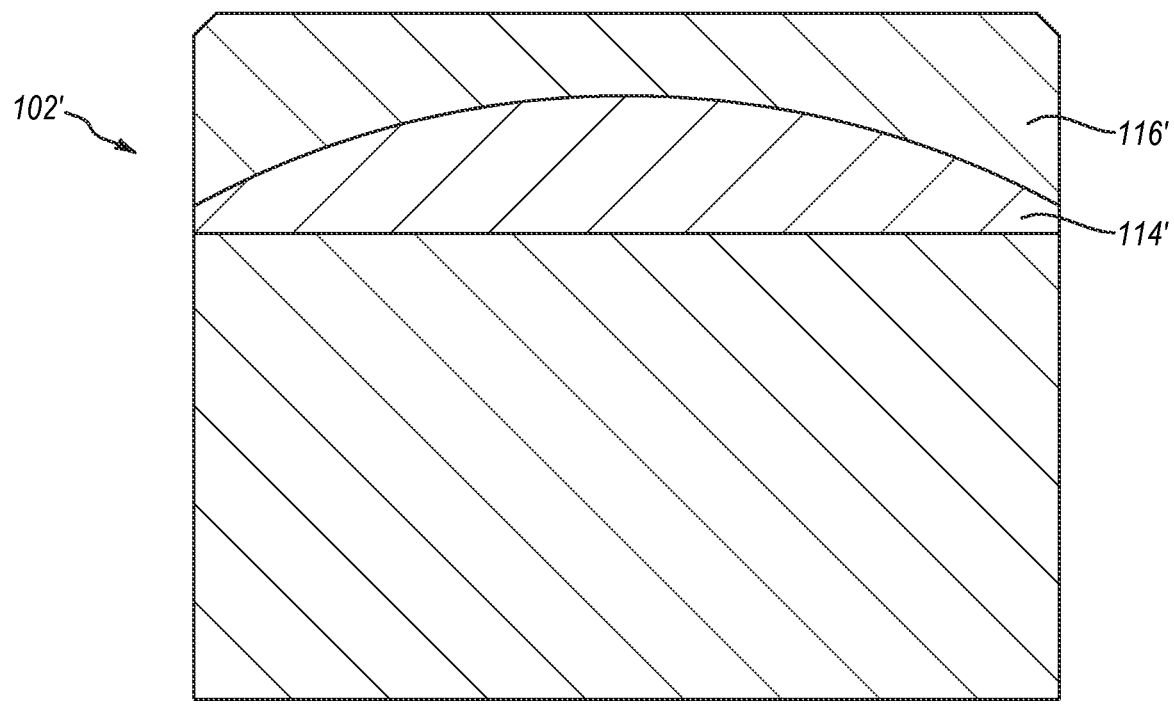
FIGS. 2D-2G are cross-sectional views illustrating different geometries for the two regions in the PCD table shown in FIG. 2C according to various embodiments.
Figure 2E:
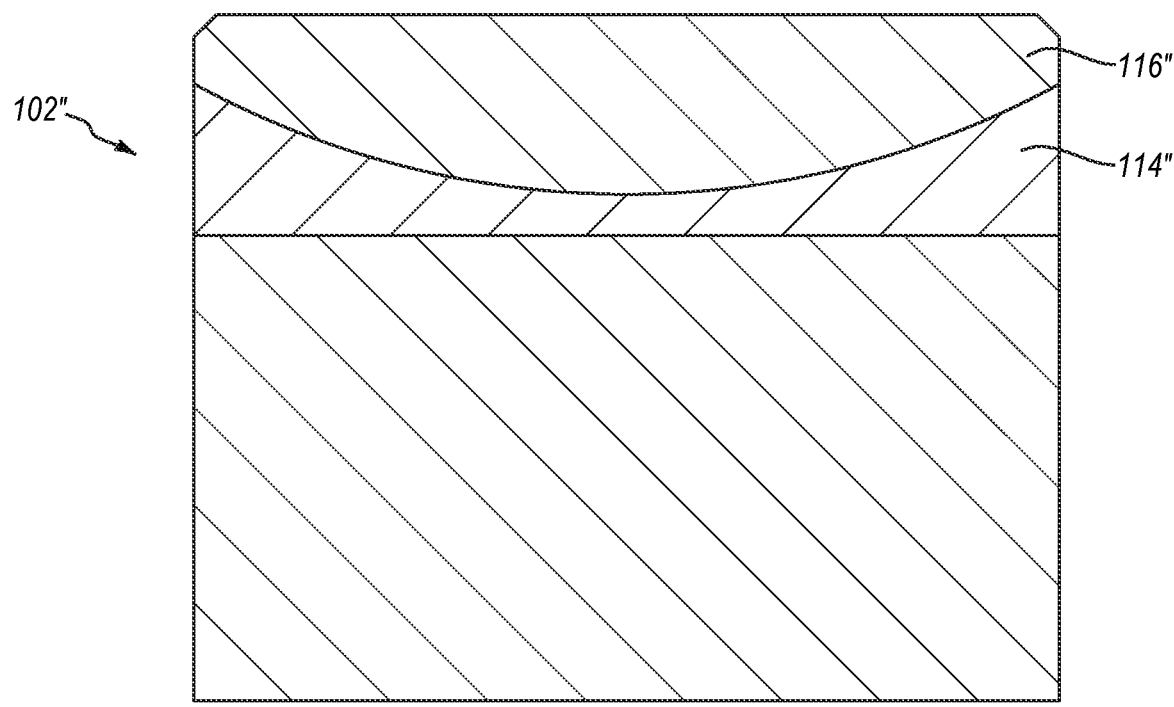
Figure 2F:
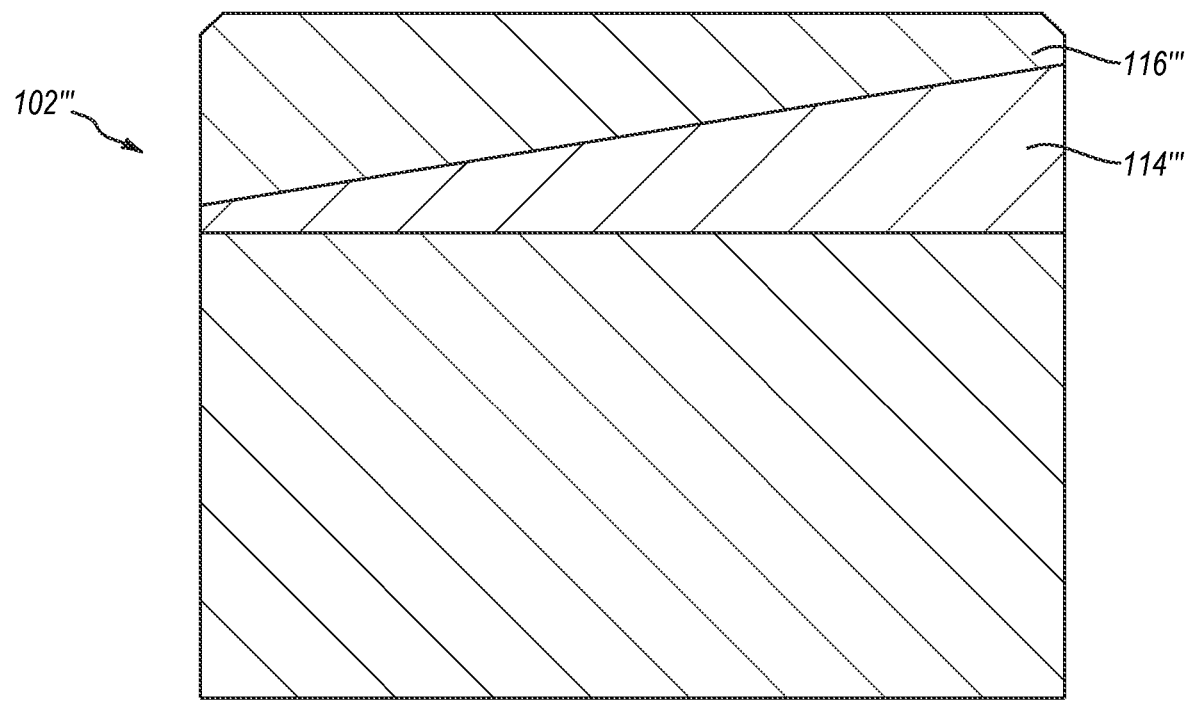
Figure 2G:
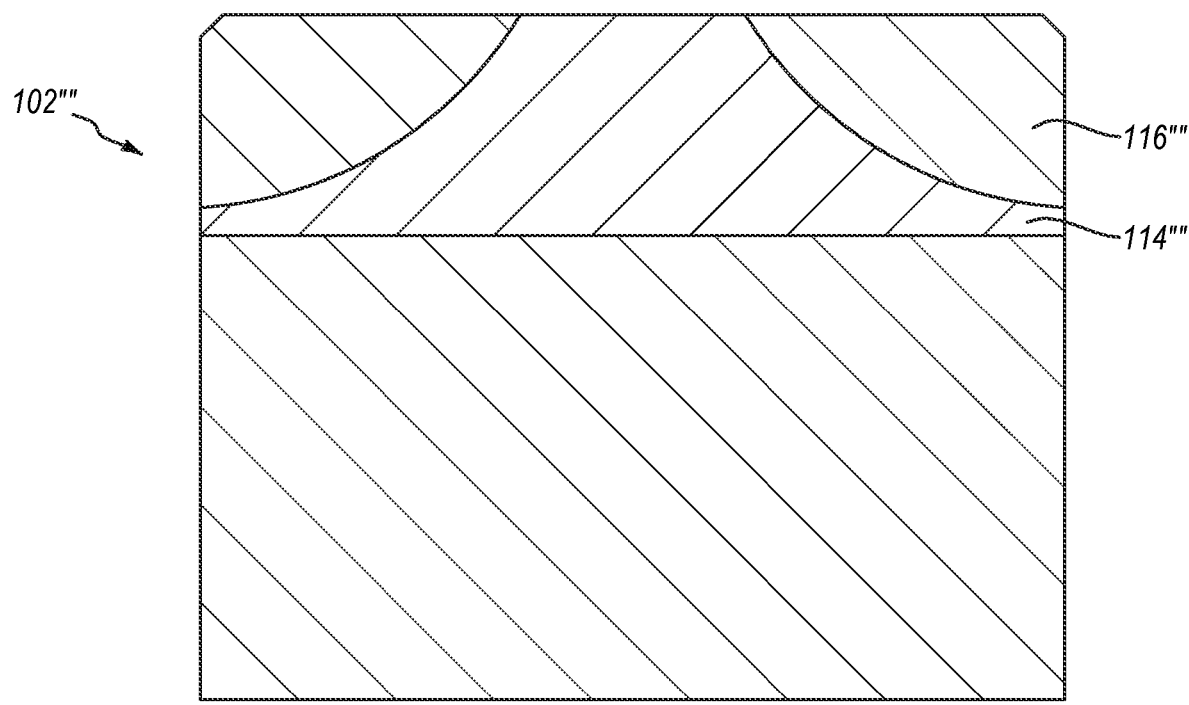

FIGS. 2D-2G are cross-sectional views illustrating different geometries for the lower and upper regions 114 and 116 of the PCD table 102 shown in FIG. 2C according to various embodiments. The lower and upper regions 114 and 116 may exhibit a variety of different geometries that depart from the geometries illustrated in FIG. 2C. For example, referring to FIG. 2D, a lower region 114' may exhibit a convex configuration, while an upper region 116' may exhibit a correspondingly configured concave geometry that at least partially receives the convex portion of the lower region 114'. As shown in FIG. 2E, a lower region 114" may exhibit a concave configuration, while an upper region 116" may exhibit a correspondingly configured convex geometry that is at least partially received by the lower region 114". Referring to FIG. 2F, in other embodiments, a lower region 114''' and an upper region 116''' may exhibit a gradual increase/decrease in thickness thereof across a lateral dimension (e.g., a diameter) of the PCD table 102'''. In another embodiment, illustrated in FIG. 2G, a lower region 114'''' exhibits a geometry that includes a generally central portion, while an upper region 116'''' forms at least one cutting region at a periphery of the PCD table 102''''. For example, the upper region 116'''' may be annular shaped and extend circumferentially about the central portion. The geometries for various regions shown in FIGS. 2D-2G may be fabricated by using molds and/or binders to hold the diamond particles into the desired geometry during HPHT processing. Although the illustrated embodiments of the PDCs shown in FIGS. 2C-2G utilize two regions of diamond particles, two or more, or more than three regions may be employed using geometrical configurations similar to those illustrated, or configurations that may vary from those illustrated.

Figure 3:
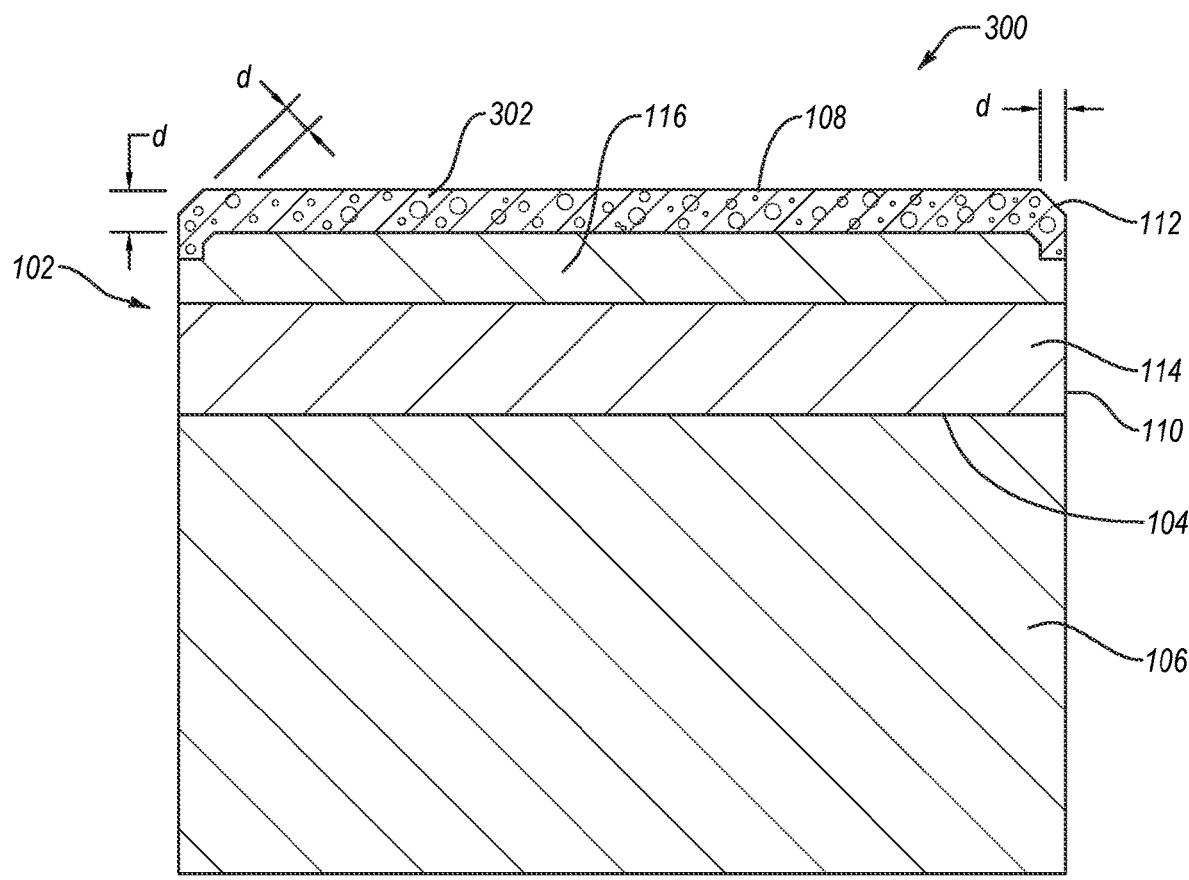
FIG. 3 is a cross-sectional view of the PDC shown in FIGS. 1A, 1B, and 2C in which a PCD table thereof has been at least partially leached.

Referring to FIG. 3, in yet another embodiment, after HPHT processing, the metal-solvent catalyst may be leached from the PCD table 102 shown in FIG. 2C to a selected depth using an acid leaching or a gaseous leaching process. For example, FIG. 3 is a cross-sectional view of an embodiment of a PDC 300 in which a metal-solvent catalyst is at least partially leached from the PCD table 102 to a selected depth "d" as measured from at least one of the upper surface 108, at least one lateral surface 110, or chamfer 112 to form a leached region 302 that is at least partially depleted of the metal-solvent catalyst. For example, the leached region 302 may generally contour the upper surface 108, the chamfer 112, and the at least one lateral surface 110. The leached region 302 may also extend along a selected length of the at least one lateral surface 110. The leached region 302 may include only a portion of the lower region 114 of the PCD table 102 as illustrated, or may include substantially all of the lower region 114 and a portion or substantially the entire upper region 116. Generally, the selected depth "d" may be greater than 250 µm, greater than 300 µm to about 425 µm, greater than 350 µm to about 400 µm, greater than 350 µm to about 375 µm, about 375 µm to about 400 µm, about 500 µm to about 650 µm, about 400 µm to about 600 µm, about 600 µm to about 800 µm, or about 10 µm to about 500 µm. In some embodiments, the leached region 302 may be positioned entirely within the initial cutting region, at least a portion of the upper region 116, a portion of the lower region 114, or combinations thereof.

A residual amount of the metal-solvent catalyst may still be present in the leached region 302 even after leaching. For example, the metal-solvent catalyst may comprise about 0.8 weight % to about 1.50 weight % and, more particularly, about 0.9 weight % to about 1.2 weight % of the leached region 302. The leaching may be performed in a suitable acid (e.g., aqua regia, nitric acid, hydrochloric acid, hydrofluoric acid, or combinations thereof) so that the leached region 302 of the PCD table 102 is substantially free of the metal-solvent catalyst. As a result of the metal-solvent catalyst being depleted from the leached region 302, the at least partially leached PCD table 102 is relatively more thermally stable than prior to leaching.

In some embodiments, the leaching to form the leached region 302 may be accomplished by exposing the PCD table 102 to a gaseous leaching agent that is selected to substantially remove all of the metal-solvent catalyst from the interstitial regions of the PCD table 102. For example, a gaseous leaching agent may be selected from at least one halide gas, at least one inert gas, a gas from the decomposition of an ammonium halide salt, hydrogen gas, carbon monoxide gas, an acid gas, and mixtures thereof. For example, a gaseous leaching agent may include mixtures of a halogen gas (e.g., chlorine, fluorine, bromine, iodine, or combinations thereof) and an inert gas (e.g., argon, xenon, neon, krypton, radon, or combinations thereof). Other gaseous leaching agents include mixtures including hydrogen chloride gas, a reducing gas (e.g., carbon monoxide gas), gas from the decomposition of an ammonium salt (such as ammonium chloride which decomposes into chlorine gas, hydrogen gas and nitrogen gas), and mixtures of hydrogen gas and chlorine gas (which will form hydrogen chloride gas, in situ), acid gases such as hydrogen chloride gas, hydrochloric acid gas, hydrogen fluoride gas, and hydrofluoric acid gas. Any combination of any of the disclosed gases may be employed as the gaseous leaching agent. In an embodiment, a reaction chamber may be filled with a gaseous leaching agent of about 10 volume % to about 20 volume % chlorine with the balance being argon and the gaseous leaching agent being at an elevated temperature of at least about 300° C. to about 800° C. In another embodiment, the elevated temperature may be between at least about 600° C. to about 700° C. More specifically, in another embodiment, the elevated temperature may be at least about 650° C. to about 700° C.

Additional details about gaseous leaching processes for leaching PCD elements are disclosed in U.S. application Ser. No. 13/324,237. U.S. application Ser. No. 13/324,237 is incorporated herein, in its entirety, by this reference.

In other embodiments, the PCD table 102 may be initially formed using an HPHT sintering process (i.e., a pre-formed PCD table) and, subsequently, bonded to the interfacial surface 104 of the substrate 106 by brazing, using a separate HPHT bonding process, or any other suitable joining technique, without limitation. For example, the PCD table 102 may be HPHT sintered and then separated from the substrate 106 using any suitable material removal process, such as grinding or machining. In another embodiment, a PCD table may be HPHT sintered without a substrate. The PCD table 102 may be leached to at least partially remove or to remove substantially all of the metal-solvent catalyst therein. The leached PCD table 102 may be placed with the lower region 114 adjacent to another substrate 106 and subjected to any of the HPHT processes disclosed herein so that a metallic infiltrant from the substrate 106 (e.g., cobalt from a cobalt-cemented tungsten carbide substrate) re-infiltrates the leached PCD table 102. The infiltrated PCD table 102 bonds to the substrate 106 during cooling from the HPHT process. The infiltrated PCD table 102 may be at least partially leached to form a PDC configured the same or similarly to the PDC 300 shown in FIG. 3.

WORKING EXAMPLES

The following working examples provide further detail in connection with the specific embodiments described above. Working examples 1-3 and 7-11 fabricated according to specific embodiments of the invention are compared to comparative working examples 4-6 and 12-16.

Working Example 1

One PDC was formed according to the following process. A first layer of diamond particles having an average particle size of about 70 μm mixed with about 5 weight % tungsten carbide was disposed on a cobalt-cemented tungsten carbide substrate. A second layer of diamond particles having an average particle size of about 28.6 μm diamond particles was disposed adjacent to the first layer of diamond particles. The two layers of diamond particles and the cobalt-cemented tungsten carbide substrate were HPHT processed in a high-pressure cubic press at a temperature of about 1400° C. and a cell pressure of about 5.5 GPa to form a PDC comprising a PCD table integrally formed and bonded to the cobalt-cemented tungsten carbide substrate. The PCD table exhibited a thickness of about 0.0902 inch and a chamfer exhibiting a length of 0.0117 inch at an angle of about 45° with respect to a top surface of the PCD table was machined therein.

Figure 4:
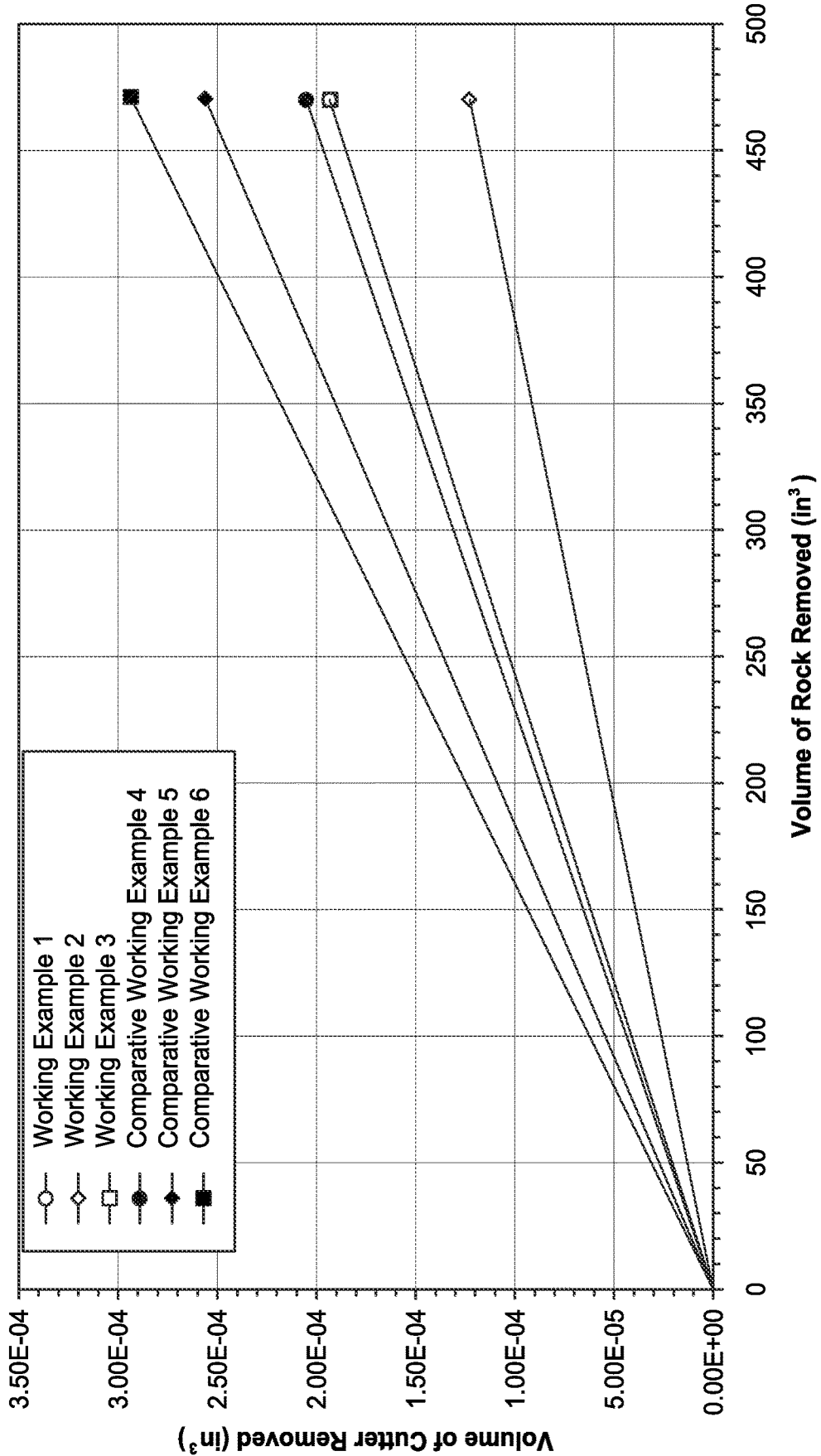
FIG. 4 is a graph of wear resistance test data for PDCs according to various working examples of invention and various comparative working examples.

The abrasion resistance of the PDC of working example 1 was evaluated using a VTL test by measuring the volume of PDC removed versus the volume of Bane granite workpiece removed, while the workpiece was cooled with water. The test parameters used were a depth of cut for the PDC of about 0.254 mm, a back rake angle for the PDC of about 20 degrees, an in-feed for the PDC of about 6.35 mm/rev, and a rotary speed of the workpiece to be cut of about 101 RPM. FIG. 4 shows the abrasion resistance VTL test results for the PDC of working example 1, with a volume of rock removed of about 470 in$^3$, and a volume of cutter removed of about $1.90 \times 10^{-4}$ in$^3$ resulting in a $G_{ratio}$ of about $2.47 \times 10^6$ (where the larger the $G_{ratio}$, the greater the abrasion resistance).

Working Example 2

One PDC was formed according to the process described for working example 1. The PCD table exhibited a thickness of about 0.0884 inch and a chamfer exhibiting a length of 0.0121 inch at an angle of about 45° with respect to a top surface of the PCD table was machined therein.

The abrasion resistance of the PDC of working example 2 was evaluated by measuring the volume of PDC removed versus the volume of Barre granite workpiece removed, while the workpiece was cooled with water, using the same workpiece and the same test parameters as working example 1. FIG. 4 shows the abrasion resistance test results for the PDC of working example 2, with a volume of rock removed of 470 in$^3$, and a volume of cutter removed of about $1.20 \times 10^{-4}$ in$^3$ resulting in a $G_{ratio}$ of about $3.92 \times 10^6$. As shown in FIG. 4, the abrasion resistance or wear resistance of the PDC of working example 2 was greater than that of the PDC of working example 1 ($G_{ratio}$ of about $2.47 \times 10^6$).

Working Example 3

One PDC was formed according to the process described for comparative working example 1. The PCD table exhibited a thickness of about 0.0875 inch and a chamfer exhibiting a length of about 0.0123 inch at an angle of about 45° with respect to a top surface of the PCD table was machined therein.

The abrasion resistance of the PDC of working example 3 was evaluated by measuring the volume of PDC removed versus the volume of Barre granite workpiece removed, while the workpiece was cooled with water, using the same workpiece and the same test parameters as working example 1. FIG. 4 shows the abrasion resistance test results for the PDC of working example 3, with a volume of rock removed of 470 in$^3$, and a volume of cutter removed of about 1.90×10$^{-4}$ in$^3$ resulting in a $G_{ratio}$ of about 2.47×10$^6$. As shown in FIG. 4, the abrasion resistance of the PDC of working example 3 was about the same as that of the PDC in working example 1 (Gram of about 2.47×10$^6$) and less than that of the PDC of working example 2 ($G_{ratio}$ of about 3.92×10$^6$). The average $G_{ratio}$ value for all working examples 1, 2 and 3 was about 2.95×10$^6$.

Comparative Working Example 4

One PDC was formed according to the following process. A first layer of diamond particles having an average particle size of about 30 µm mixed with about 10 weight % tungsten carbide was disposed on a cobalt-cemented tungsten carbide substrate. A second layer of diamond particles having an average particle size of about 28.6 µm diamond particles was disposed adjacent to the first layer of diamond particles. The two layers of diamond particles and the cobalt-cemented tungsten carbide substrate were HPHT processed in a high-pressure cubic press at a temperature of about 1400° C. and a cell pressure of about 5.5 GPa to form a PDC comprising a PCD table integrally formed and bonded to the cobalt-cemented tungsten carbide substrate. The PCD table exhibited a thickness of about 0.0950 inch and a chamfer exhibiting a length of about 0.0112 inch at an angle of about 45° with respect to a top surface of the PCD table was machined therein.

The abrasion resistance of the conventional PDC of comparative working example 4 was evaluated by measuring the volume of PDC removed versus the volume of Barre granite workpiece removed using the same test parameters and workpiece as working example 1. FIG. 4 shows the abrasion resistance test results for the PDC of comparative working example 4, with a volume of rock removed of about 470 in$^3$, and a volume of cutter removed of about 2.10×10$^{-4}$ in$^3$ resulting in a $G_{ratio}$ of about 2.24×10$^6$. The abrasion resistance $G_{ratio}$ of about 2.24×10$^6$ indicating a diminished abrasion resistance than that of all three working examples, 1, 2 and 3 (each with Gram values of about 2.47×10$^6$, about 3.92×10$^6$ and about 2.47×10$^6$, respectively).

Comparative Working Example 5

One PDC was formed according to the process described for comparative working example 4. The PCD table formed exhibited a thickness of about 0.0963 inch and a chamfer exhibiting a length of about 0.0114 inch at an angle of about 45° with respect to a top surface of the PCD table was machined therein.

The abrasion resistance of the conventional PDC of comparative working example 5 was evaluated by measuring the volume of PDC removed versus the volume of Barre granite workpiece removed, while the workpiece was cooled with water, using the same workpiece and the same test parameters as described above for working example 1. FIG. 4 shows the abrasion resistance test results for the PDC of comparative working example 5, with a volume of rock removed of about 470 in$^3$, and a volume of cutter removed of about 2.55×10$^{-4}$ in$^3$ resulting in a $G_{ratio}$ of about 1.84× 10$^6$. As shown in FIG. 4, the abrasion resistance or wear resistance of the PDC of comparative working example 5 was less than that of the PDC of comparative working example 4, ($G_{ratio}$ of about 2.24×10$^6$) and less than all of the working examples 1, 2 or 3 (each with $G_{ratio}$ values of about 2.47×10$^{-6}$, about 3.92×10$^6$ and about 2.47×10$^6$, respectively).

Comparative Working Example 6

One PDC was formed according to the process described for comparative working example 4. The PCD table exhibited a thickness of about 0.0923 inch and a chamfer exhibiting a length of about 0.0128 inch at an angle of about 45° with respect to a top surface of the PCD table was machined therein.

The abrasion resistance of the PDC of comparative working example 6 was evaluated by measuring the volume of PDC removed versus the volume of Barre granite workpiece removed, while the workpiece was cooled with water, using the same workpiece and the same test parameters as working example. FIG. 4 shows the abrasion resistance test results for the PDC of comparative working example 6, with a volume of rock removed of about 470 in$^3$, and a volume of cutter removed of about 2.90×10$^{-4}$ in$^3$ resulting in a $G_{ratio}$ of about 1.62×10$^6$. As shown in FIG. 4, the abrasion resistance of the PDC of comparative working example 6 is less than that of the PDCs in comparative working examples 4 and 5. The average $G_{ratio}$ value for all comparative working examples 4, 5 and 6 is about 1.9×10$^{6'}$ indicating a reduction in abrasion resistance as compared to PDCs of working examples 1, 2 and 3 having an average $G_{ratio}$ value of about 2.95×10$^6$.

Test results displayed in FIG. 4 showed that working examples 1-3 exhibited less cutter removal than comparative examples 4-6 for an equal amount of volume of rock removed, demonstrating an enhanced abrasion resistance of the PDCs of working examples 1-3. As working examples 1-3 were prepared using substantially the same parameters as the comparative examples 4-6 except for the substitution of the first layer of coarse diamond grains in the working examples (i.e., 70 µm), the $G_{ratio}$ values were compared to evaluate the advantage of working examples 1-3. The comparison of the $G_{ratio}$ values demonstrated that the average results for the working examples 1-3 had a substantially higher average $G_{ratio}$ value than that of the comparative examples 4-6 (about 2.95×10$^6$ and about 1.9×10$^6$, respectively). These results were consistent with a correlation between the improved abrasion resistance of the working examples 1-3 and the design of the PCD tables to include layers of diamond grains with increasing grain size with distance from the substrate.

Working Example 7

One PDC was formed according to the following process. A first layer of diamond particles having an average particle size of about 65 µm mixed with about 10 weight % tungsten carbide and about 2 weight % tungsten was disposed on a cobalt-cemented tungsten carbide substrate. A second layer of diamond particles, having an average particle size of about 19 was disposed adjacent to the first layer of diamond particles. The two layers of diamond particles and the cobalt-cemented tungsten carbide substrate were HPHT processed in a high-pressure cubic press at a temperature of about 1400° C. and a cell pressure of about 7.7 GPa to form a PDC comprising a PCD table integrally formed and bonded to the cobalt-cemented tungsten carbide substrate. The PCD table exhibited a thickness of about 0.0816 inch and a chamfer exhibiting a length of about 0.0123 inch at an angle of about 45° with respect to a top surface of the PCD table was machined therein.

Figure 5:
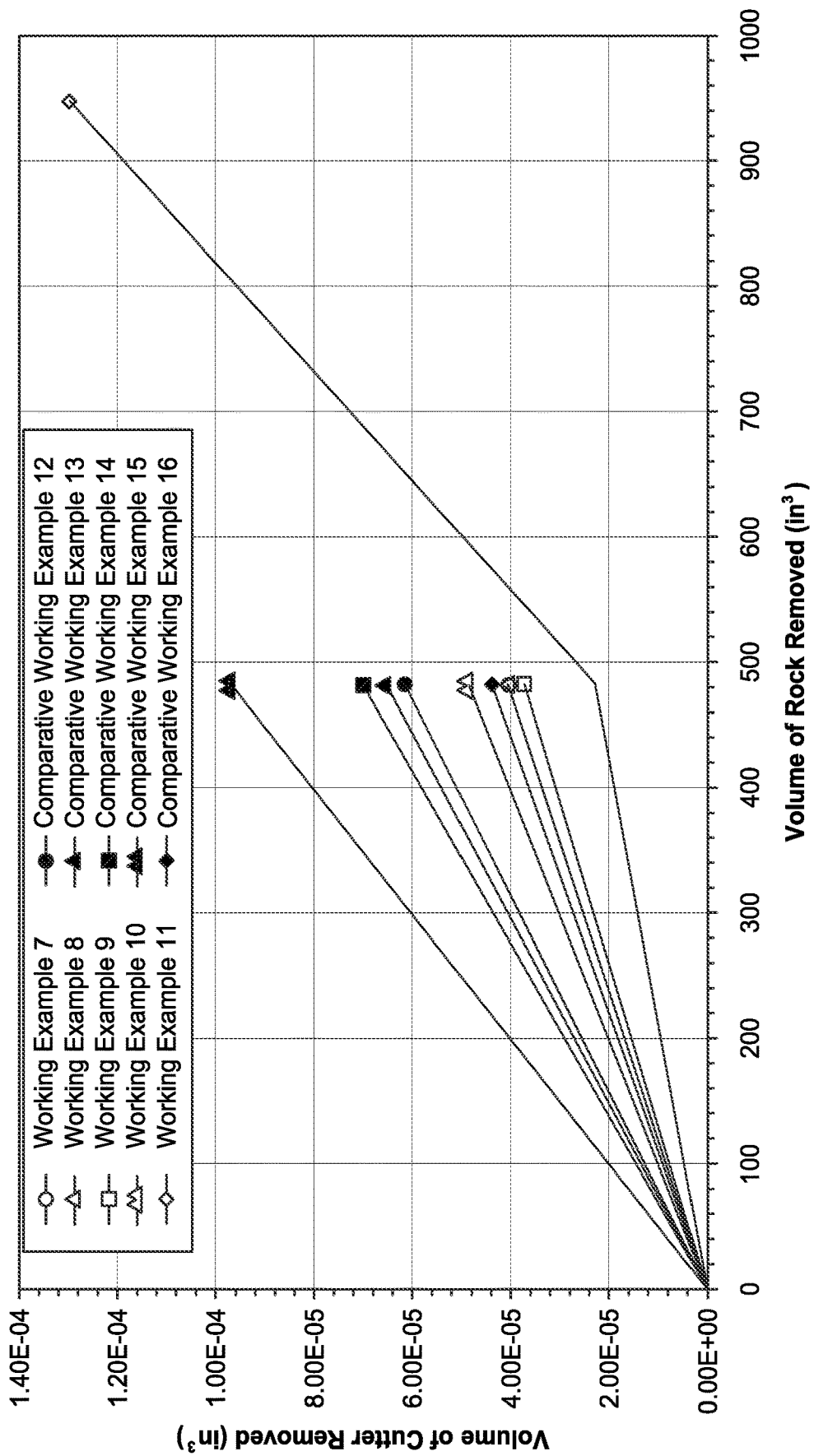
FIG. 5 is a graph of wear resistance test data for PDCs according to various working examples of invention and various comparative working examples.

The abrasion resistance of the PDC of working example 7 was evaluated by measuring the volume of PDC removed versus the volume of Barre granite workpiece removed using the same test parameters as working examples 1-3. FIG. 5 shows the abrasion resistance test results for the PDC of working example 7, with a volume of rock removed of about 480 in$^3$, and a volume of cutter removed of about 4.0×10$^{-5}$ in$^3$ resulting in a $G_{ratio}$ of about 1.2×10$^7$.

Working Example 8

One PDC was formed according to the process described for working example 7. The PCD table formed exhibited a thickness of about 0.0822 inch and a chamfer exhibiting a length of 0.0123 inch at an angle of about 45° with respect to a top surface of the PCD table was machined therein.

The abrasion resistance of the conventional PDC of working example 8 was evaluated by measuring the volume of PDC removed versus the volume of Barre granite workpiece removed, while the workpiece was cooled with water, using the same workpiece and the same test parameters as described above for working example 7. FIG. 5 shows the abrasion resistance test results for the PDC of working example 8, with a volume of rock removed of about 480 in$^3$, and a volume of cutter removed of about 4.00×10$^{-5}$ in$^3$ resulting in a $G_{ratio}$ of about 1.2×10$^7$. As shown in FIG. 5, the abrasion resistance or wear resistance of the PDC of working example 8 was about identical to that of the PDC of working example 7, both with $G_{ratio}$ values of about 1.2×10$^7$.

Working Example 9

One PDC was formed according to the process described for working example 7. The PCD table exhibited a thickness of about 0.0772 inch and a chamfer exhibiting a length of about 0.0118 inch at an angle of about 45° with respect to a top surface of the PCD table was machined therein.

The abrasion resistance of the PDC of working example 9 was evaluated by measuring the volume of PDC removed versus the volume of Barre granite workpiece removed, while the workpiece was cooled with water, using the same workpiece and the same test parameters as working example 7. FIG. 5 shows the abrasion resistance test results for the PDC of working example 9, with a volume of rock removed of about 480 in$^3$, and a volume of cutter removed of about 3.60×10$^{-5}$ in$^3$ resulting in a $G_{ratio}$ of about 1.33×10$^7$. As shown in FIG. 5, the abrasion resistance of the PDC of working example 9 is slightly greater than that of the PDCs in working examples 7 and 8 (each with a $G_{ratio}$ of about 1.2×10$^7$).

Working Example 10

One PDC was formed according to the process described for working example 7. The PCD table formed exhibited a thickness of about 0.0775 inch and a chamfer exhibiting a length of about 0.0120 inch at an angle of about 45° with respect to a top surface of the PCD table was machined therein.

The abrasion resistance of the PDC of working example 10 was evaluated by measuring the volume of PDC removed versus the volume of Barre granite workpiece removed, while the workpiece was cooled with water, using the same workpiece and the same test parameters as described above for working example 7. FIG. 5 shows the abrasion resistance test results for the PDC of working example 10, with a volume of rock removed of about 480 in$^3$, and a volume of cutter removed of about 4.80×10$^{-5}$ in$^3$ resulting in a $G_{ratio}$ of about 1.00×10$^7$. As shown in FIG. 5, the abrasion resistance or wear resistance of the PDC of working example 10 was very close to that of the PDC of working examples 7 and 8 (each with a $G_{ratio}$ of about 1.2×10$^7$), and close to that of working example 9 with a $G_{ratio}$ of about 1.33×10$^7$.

Working Example 11

One PDC was formed according to the process described for working example 7. The PCD table exhibited a thickness of about 0.0816 inch and a chamfer exhibiting a length of about 0.0119 inch at an angle of about 45° with respect to a top surface of the PCD table was machined therein.

The abrasion resistance of the PDC of working example 11 was evaluated by measuring the volume of PDC removed versus the volume of Barre granite workpiece removed, while the workpiece was cooled with water, using the same workpiece and the same test parameters as working example 7 above. FIG. 5 shows the abrasion resistance test results for the PDC of working example 11, with a volume of rock removed of about 480 in$^3$, and a volume of cutter removed of about 2.40×10$^{-5}$ in$^3$ resulting in a $G_{ratio}$ of about 2.0×10$^7$. As shown in FIG. 5, the abrasion resistance of the PDC of working example 11 is greater than that of the PDCs in working examples 7-9. The average $G_{ratio}$ value for all working examples 7-11 was about 1.35×10$^7$.

FIG. 5 also shows additional data for this working example 11 with abrasion resistance test results indicating a volume of rock removed of about 940 in$^3$, and a volume of cutter removed of about 1.28×10$^{-4}$ in$^3$ that resulted in a $G_{ratio}$ of about 7.34×10$^6$. Because this is the only data point collected reflecting a volume of rock removed of 940 in$^3$, it will not be included in the analysis to follow these examples.

Comparative Working Example 12

One PDC was formed according to the following process. A first layer of diamond particles having an average particle size of about 20 μm mixed with about 10 weight % tungsten carbide was disposed on a cobalt-cemented tungsten carbide substrate. A second layer of diamond particles having an average particle size of about 19 μm diamond particles was disposed adjacent to the first layer of diamond particles. The two layers of diamond particles and the cobalt-cemented tungsten carbide substrate were HPHT processed in a high-pressure cubic press using a small anvil at a temperature of about 1400° C. and a cell pressure of about 7.7 GPa to form a PDC comprising a PCD table integrally formed and bonded to the cobalt-cemented tungsten carbide substrate. The PCD table exhibited a thickness of about 0.0800 inch and a chamfer exhibiting a length of about 0.0117 inch at an angle of about 45° with respect to a top surface of the PCD table was machined therein.

The abrasion resistance of the conventional PDC of comparative working example 12 was evaluated by measuring the volume of PDC removed versus the volume of Barre granite workpiece removed using the same workpiece and test parameters as working example 7. FIG. 5 shows the abrasion resistance test results for the PDC of working example 12, with a volume of rock removed of about 480 in$^3$, and a volume of cutter removed of about 6.10×10$^{-5}$ in$^3$ resulting in a $G_{ratio}$ of about 7.87×10$^6$. Thus, comparative working example 12 exhibited less abrasive resistance than any of the working examples 7-11 (with an average $G_{ratio}$ value of about 1.35×10$^7$).

Comparative Working Example 13

One PDC was formed according to the process described for comparative working example 12. The PCD table formed exhibited a thickness of about 0.0823 inch and a chamfer exhibiting a length of about 0.0121 inch at an angle of about 45° with respect to a top surface of the PCD table was machined therein.

The abrasion resistance of the PDC of comparative working example 13 was evaluated by measuring the volume of PDC removed versus the volume of Barre granite workpiece removed, while the workpiece was cooled with water, using the same workpiece and the same test parameters as described above for working example 7. FIG. 5 shows the abrasion resistance test results for the PDC of comparative working example 13, with a volume of rock removed of about 480 in$^3$, and a volume of cutter removed of about 6.60×10$^{-5}$ in$^3$ resulting in a $G_{ratio}$ of about 7.27×10$^6$. As shown in FIG. 5, the abrasion resistance or wear resistance of the PDC of comparative working example 13 was less than that of the PDC of comparative working example 12 with a $G_{ratio}$ value of about 7.87×10$^6$, and also exhibited less abrasive resistance than any of the working examples 7-11 (with an average $G_{ratio}$ value of about 1.35×10$^7$).

Comparative Working Example 14

One PDC was formed according to the process described for comparative working example 12. The PCD table exhibited a thickness of about 0.0802 inch and a chamfer exhibiting a length of about 0.0120 inch at an angle of about 45° with respect to a top surface of the PCD table was machined therein.

The abrasion resistance of the PDC of comparative working example 14 was evaluated by measuring the volume of PDC removed versus the volume of Barre granite workpiece removed, while the workpiece was cooled with water, using the same workpiece and the same test parameters as working example 7. FIG. 5 shows the abrasion resistance test results for the PDC of comparative working example 14, with a volume of rock removed of about 480 in$^3$, and a volume of cutter removed of about 7.0×10$^{-5}$ in$^3$ resulting in a $G_{ratio}$ of about 6.86×10$^6$. As shown in FIG. 5, the abrasion resistance of the PDC of comparative working example 14 was less than that of the PDCs in comparative working examples 12 and 13 and also exhibited less abrasive resistance than any of the working examples 7-11 (with an average $G_{ratio}$ value of about 1.35×10$^7$).

Comparative Working Example 15

One PDC was formed according to the process described for comparative working example 12. The PCD table formed exhibited a thickness of about 0.0811 inch and a chamfer exhibiting a length of about 0.0119 inch at an angle of about 45° with respect to a top surface of the PCD table was machined therein.

The abrasion resistance of the PDC of comparative working example 15 was evaluated by measuring the volume of PDC removed versus the volume of Barre granite workpiece removed, while the workpiece was cooled with water, using the same workpiece and the same test parameters as described above for working example 7. FIG. 5 shows the abrasion resistance test results for the PDC of comparative working example 15, with a volume of rock removed of about 480 in$^3$, and a volume of cutter removed of about 9.60×10$^{-5}$ in$^3$ resulting in a $G_{ratio}$ of about 5.0×10$^6$. As shown in FIG. 5, the abrasion resistance or wear resistance of the PDC of comparative working example 15 was less than that of all of the PDC of comparative working examples 12-14 (each with a $G_{ratio}$ of about 7.87×10$^6$, about 7.27×10$^6$, and about 6.86×10$^6$ respectively). Comparative example 15 also exhibited less abrasive resistance than that of working examples 7-11 (average $G_{ratio}$ of about 1.35×10$^7$).

Comparative Working Example 16

One PDC was formed according to the process described for comparative working example 12. The PCD table exhibited a thickness of about 0.0816 inch and a chamfer exhibiting a length of about 0.0125 inch at an angle of about 45° with respect to a top surface of the PCD table was machined therein.

The abrasion resistance of the PDC of comparative working example 16 was evaluated by measuring the volume of PDC removed versus the volume of Barre granite workpiece removed, while the workpiece was cooled with water, using the same workpiece and the same test parameters as working example 7 above. FIG. 5 shows the abrasion resistance test results for the PDC of comparative working example 16, with a volume of rock removed of about 480 in$^3$, and a volume of cutter removed of about 4.40×10$^{-5}$ in$^3$ resulting in a $G_{ratio}$ of about 1.09×10$^7$. As shown in FIG. 5, the abrasion resistance of the PDC of comparative working example 16 is greater than that of the PDCs in comparative working examples 12-15, but still fell short of the abrasion resistance of working examples 7-11 with an average $G_{ratio}$ value for all working examples 7-11 of about 1.35×10$^7$.

As demonstrated by test results described in FIG. 4, the test results shown in FIG. 5 also demonstrated that the working examples 7-11 generally exhibited increased abrasion resistance as compared to a PDC without the coarse diamond sub-layer (comparative examples 12-16). As working examples 7-11 were prepared using the same parameters as the comparative examples 12-16, except for the first layer of coarse diamond grains (i.e., 65 μm), the $G_{ratio}$ values of working examples 7-11 and comparative examples 12-16 were compared to demonstrate the advantage of the specific PCD architecture of working examples 7-11. Comparison of both average $G_{ratio}$ values, about 1.35×10$^7$ and about 7.58× 10$^6$, working examples 7-11 and comparative working examples 12-16, respectively, demonstrated a substantial correlation between the improved abrasion resistance (larger $G_{ratio}$) of a PDC in the working examples and their precisely engineered PCD tables including layers of diamond grains with increasing grain size with distance from the substrate.

The disclosed PDC embodiments may be used in a number of different applications including, but not limited to, use in a rotary drill bit (FIGS. 6A and 6B), a thrust-bearing apparatus (FIG. 7), a radial bearing apparatus (FIG. 8), a mining rotary drill bit, and a wire-drawing die. The various applications discussed above are merely some examples of applications in which the PDC embodiments may be used. Other applications are contemplated, such as employing the disclosed PDC embodiments in friction stir welding tools.

Figure 6A:
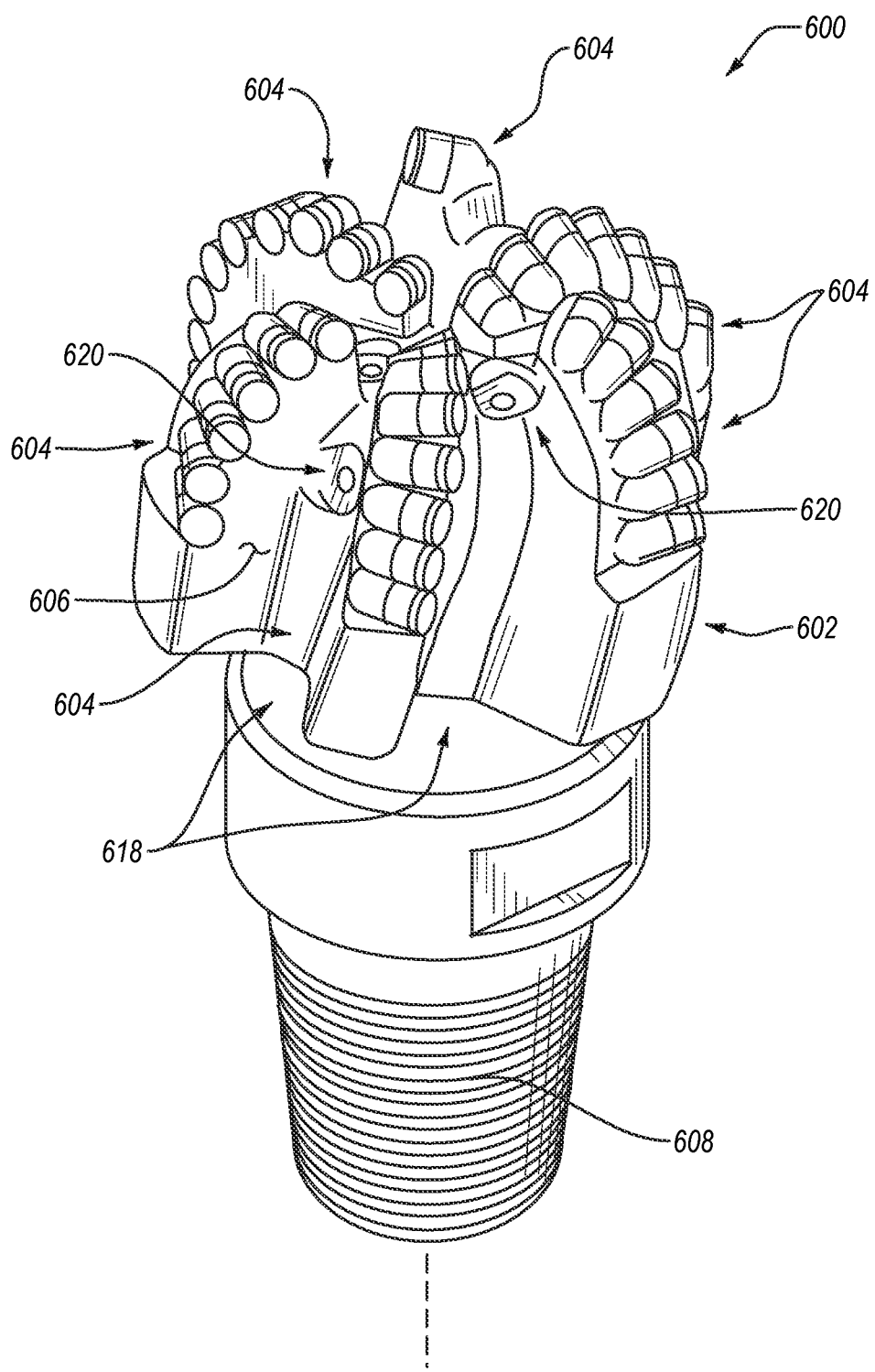
FIG. 6A is an isometric view of an embodiment of a rotary drill bit that may employ one or more of the disclosed PDC embodiments.
Figure 6B:
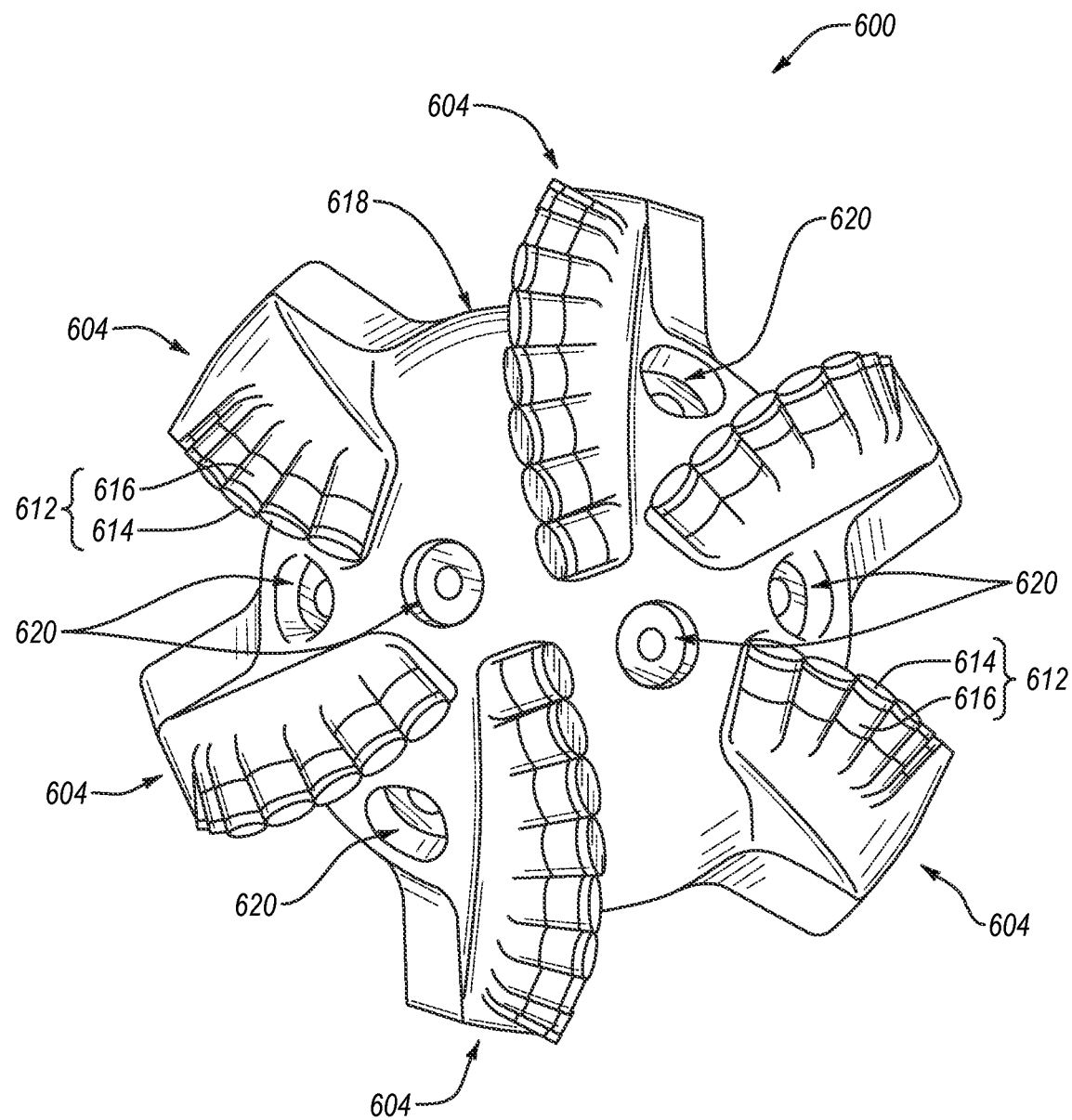
FIG. 6B is a top elevation view of the rotary drill bit shown in FIG. 6A.

FIG. 6A is an isometric view and FIG. 6B is a top elevation view of an embodiment of a rotary drill bit 600 for use in subterranean drilling applications, such as oil and gas exploration. The rotary drill bit 600 includes at least one PCD element and/or PDC configured according to any of the previously described PDC embodiments. The rotary drill bit 600 comprises a bit body 602 that includes radially and longitudinally extending blades 604 with leading faces 606, and a threaded pin connection 608 for connecting the bit body 602 to a drilling string. The bit body 602 defines a leading end structure for drilling into a subterranean formation by rotation about a longitudinal axis and application of weight-on-bit. At least one PDC cutting element, configured according to any of the previously described PDC embodiments (e.g., the PDC 100 shown in FIG. 1A) may be affixed to the bit body 602. With reference to FIG. 6B, a plurality of PDCs 612 are secured to the blades 604. For example, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 618 therebetween, as known in the art. Additionally, the rotary drill bit 600 may include a plurality of nozzle cavities 620 for communicating drilling fluid from the interior of the rotary drill bit 600 to the PDCs 612.

Figure 7:
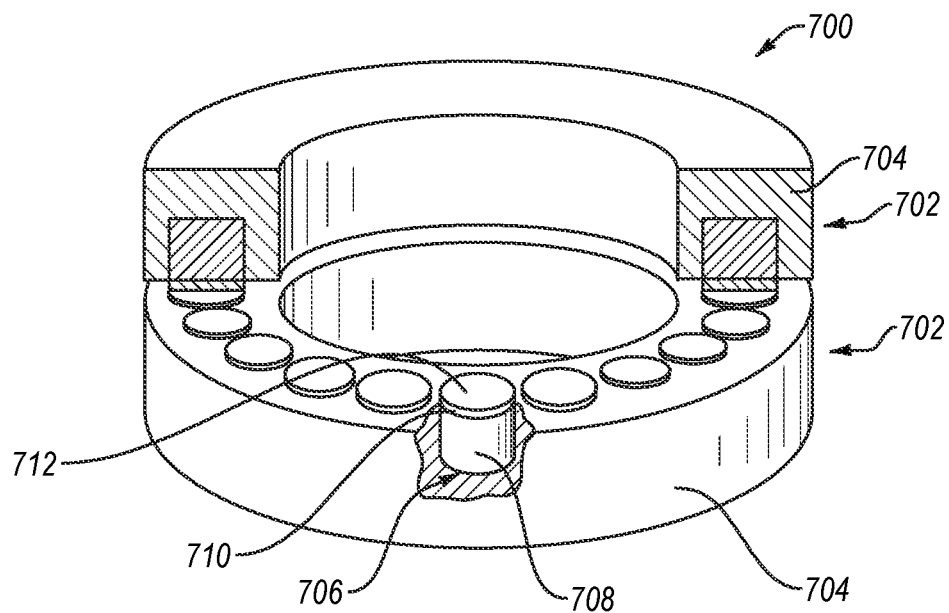
FIG. 7 is an isometric cut-away view of an embodiment of a thrust-bearing apparatus that may utilize one or more of the disclosed PDC embodiments.

FIG. 7 is an isometric cut-away view of an embodiment of a thrust-bearing apparatus 700, which may utilize any of the disclosed PDC embodiments as bearing elements. The thrust-bearing apparatus 700 includes respective thrust-bearing assemblies 702. Each thrust-bearing assembly 702 includes an annular support ring 704 that may be fabricated from a material, such as carbon steel, stainless steel, or another suitable material. Each support ring 704 includes a plurality of recesses (not labeled) that receives a corresponding bearing element 706. Each bearing element 706 may be mounted to a corresponding support ring 704 within a corresponding recess by brazing, press-fitting, using fasteners, or another suitable mounting technique. One or more, or all of bearing elements 706 may be configured according to any of the disclosed PDC embodiments. For example, each bearing element 706 may include a substrate 708 and a PCD table 710, with the PCD table 710 including a bearing surface 712.

In use, the bearing surfaces 712 of one of the thrust-bearing assemblies 702 bears against the opposing bearing surfaces 712 of the other one of the thrust-bearing assemblies 702. For example, one of the thrust-bearing assemblies 702 may be operably coupled to a shaft to rotate therewith and may be termed a "rotor." The other one of the thrust-bearing assemblies 702 may be held stationary and may be termed a "stator."

Figure 8:
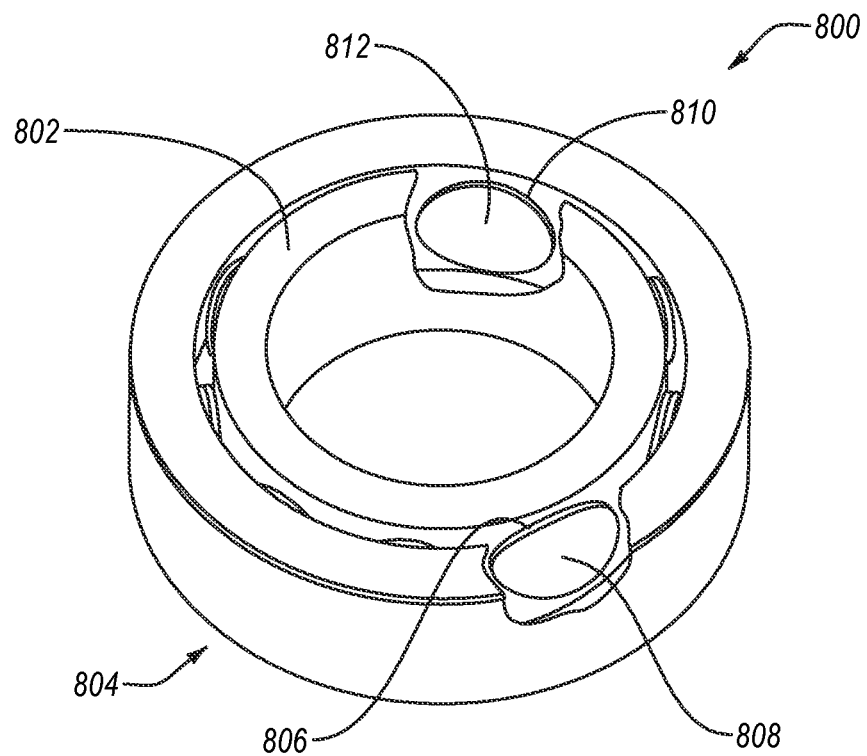
FIG. 8 is an isometric cut-away view of an embodiment of a radial bearing apparatus that may utilize one or more of the disclosed PDC embodiments.

FIG. 8 is an isometric cut-away view of an embodiment of a radial bearing apparatus 800, which may utilize any of the disclosed PDC embodiments as bearing elements. The radial bearing apparatus 800 includes an inner race 802 positioned generally within an outer race 804. The outer race 804 includes a plurality of bearing elements 810 affixed thereto that have respective bearing surfaces 812. The inner race 802 also includes a plurality of bearing elements 806 affixed thereto that have respective bearing surfaces 808. One or more, or all of the bearing elements 806 and 810 may be configured according to any of the PDC embodiments disclosed herein. The inner race 802 is positioned generally within the outer race 804 and, thus, the inner race 802 and outer race 804 may be configured so that the bearing surfaces 808 and 812 may at least partially contact one another and move relative to each other as the inner race 802 and outer race 804 rotate relative to each other during use.

The radial-bearing apparatus 800 may be employed in a variety of mechanical applications. For example, so-called "roller cone" rotary drill bits may benefit from a radial-bearing apparatus disclosed herein. More specifically, the inner race 802 may be mounted to a spindle of a roller cone and the outer race 804 may be mounted to an inner bore formed within a cone and that such an outer race 804 and inner race 802 may be assembled to form a radial-bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A polycrystalline diamond compact, comprising:
   a polycrystalline diamond table including:
      a lower region including:
         a first plurality of bonded diamond grams exhibiting a lower region average grain size; and
         a plurality of carbide particles in an amount of 1 weight percent to 15 weight percent of the lower region; and
      at least an upper region bonded to the lower region, the upper region including a second plurality of bonded diamond grains exhibiting an upper region average grain size of less than 40 μm, the lower region average grain size of at least 60 μm and being at least two times greater than that of the upper region average grain size; and
   a substrate including an interfacial surface that is bonded to the lower region of the polycrystalline diamond table.

2. The polycrystalline diamond compact of claim 1 wherein the lower region average grain size is at least 68 μm.

3. The polycrystalline diamond compact of claim 1 wherein the lower region average grain size is 60 μm to 80 μm and the upper region average grain size is 20 μm to 35 μm.

4. The polycrystalline diamond compact of claim 3 wherein the plurality of carbide particles include tungsten carbide particles.

5. The polycrystalline diamond compact of claim 1 wherein the lower region average grain size is 68 μm to 72 μm and the upper region average grain size is 28 μm to 32 μm.

6. The polycrystalline diamond compact of claim 1 wherein the lower region average grain size 2.5 to 3.5 times the upper region average grain size.

7. The polycrystalline diamond compact of claim 1 wherein the amount of the plurality of carbide particles is 1 weight percent to 5 weight percent of the lower region.

8. The polycrystalline diamond compact of claim 1 wherein the amount of the plurality of carbide particles is 5 weight percent to 15 weight percent of the lower region.

9. The polycrystalline diamond compact of claim 1 wherein the lower region includes 2 weight percent tungsten.

10. The polycrystalline diamond compact of claim 1 wherein the polycrystalline diamond table includes at least one exterior surface and a leached region extending inwardly from of the at least one exterior surface into at least the at least an upper region.

11. A method of fabricating a polycrystalline diamond compact, the method comprising:
   enclosing a precursor assembly in a pressure transmitting medium to form a cell assembly, wherein the precursor assembly includes:
      a substrate including an interfacial surface;
      a lower region positioned at least proximate to the interfacial surface of the substrate, the lower region including:
         a first plurality of diamond particles exhibiting a lower region average particle size; and
         a plurality of carbide particles present in an amount of 1 weight percent to 15 weight percent of the lower region;
      at least one upper region including a second plurality of diamond particles positioned adjacent to the lower region, the second plurality of diamond particles exhibiting an upper region average particle size of less than 40 μm, the lower region average particle size of at least 60 μm and being at least twice that of the upper region average particle size; and
   subjecting the cell assembly to a high-pressure/high-temperature process to form a polycrystalline diamond table integrally with the substrate from the precursor assembly.

12. The method of claim 11 wherein the lower region average particle size is at least 68 μm.

13. The method of claim 11 wherein the lower region average particle size is 60 μm to 80 μm and the upper region average particle size is 20 μm to 35 μm.

14. The method of claim 11 wherein the lower region average particle size is 68 to 72 μm and the upper region average particle size is 28 μm to 32 μm.

15. The method of claim 11 wherein the lower region average grain size 2.5 to 3.5 times the upper region average grain size.

16. The method of claim 11 wherein the amount of the plurality of carbide particles is 1 weight percent to 5 weight percent of the lower region.

17. The method of claim 11 wherein the amount of the plurality of carbide particles is 5 weight percent to 15 weight percent of the lower region.

18. The method of claim 11 wherein the plurality of carbide particles include tungsten carbide particles.

19. The method of claim 11 wherein subjecting the cell assembly to a high-pressure/high-temperature process to form a polycrystalline diamond table integrally with the substrate from the precursor assembly includes infiltrating at least the lower region with a metal-solvent catalyst from the substrate.

20. The method of claim 19, further comprising at least partially removing the metal-solvent catalyst from at least a portion of the polycrystalline diamond table.

* * * * *